(12) United States Patent
Kim et al.

(10) Patent No.: US 10,585,553 B2
(45) Date of Patent: Mar. 10, 2020

(54) DISPLAY DEVICE AND METHOD OF CONTROLLING THE SAME

(71) Applicant: Samsung Electronics Co., Ltd., Suwon-si, Gyeonggi-do (KR)

(72) Inventors: Young-Jin Kim, Suwon-si (KR); Kang-Tae Kim, Yongin-si (KR); Dae-Wook Park, Suwon-si (KR); Seung-Woon Lee, Suwon-si (KR); Jung-Hwan Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 670 days.

(21) Appl. No.: 14/079,146

(22) Filed: Nov. 13, 2013

(65) Prior Publication Data

US 2014/0164990 A1 Jun. 12, 2014

Related U.S. Application Data

(60) Provisional application No. 61/734,097, filed on Dec. 6, 2012, provisional application No. 61/737,540, filed
(Continued)

(30) Foreign Application Priority Data

Feb. 1, 2013 (KR) .................. 10-2013-0012077

(51) Int. Cl.
*G06F 3/048* (2013.01)
*G06F 3/0481* (2013.01)
(Continued)

(52) U.S. Cl.
CPC ........ *G06F 3/04817* (2013.01); *G06F 3/0486* (2013.01); *G06F 3/0488* (2013.01); *G06F 2203/04803* (2013.01)

(58) Field of Classification Search
None
See application file for complete search history.

(56) References Cited

U.S. PATENT DOCUMENTS 5,422,993 A 6/1995 Fleming
5,487,143 A 1/1996 Southgate
(Continued)

FOREIGN PATENT DOCUMENTS

CN 1344989 A 4/2002
CN 1458576 A 11/2003
(Continued)

OTHER PUBLICATIONS

Australian Examination Report dated Nov. 15, 2018 issued in AU Application 2013355486.
(Continued)

*Primary Examiner* — William C Trapanese
(74) *Attorney, Agent, or Firm* — Jefferson IP Law, LLP

(57) ABSTRACT

A method for controlling a display device that includes a touch screen is provided. The method includes establishing a plurality of window display spaces in the touch screen, wherein each of the plurality of window display spaces displays a window for running an application, displaying a launcher application in one of the plurality of window display spaces, the launcher application presenting at least one icon to run at least one application, receiving in the launcher application a new application run command to run a new application, and displaying a new window for running the new application in one of the other window display spaces than the window display space where the launcher application is displayed, in response to the new application run command.

47 Claims, 57 Drawing Sheets

Related U.S. Application Data on Dec. 14, 2012, provisional application No. 61/740,887, filed on Dec. 21, 2012.

(51) Int. Cl.
*G06F 3/0488* (2013.01)
*G06F 3/0486* (2013.01)

(56) References Cited

U.S. PATENT DOCUMENTS

| | | | |
|---|---|---|---|
| 5,734,380 A * | 3/1998 | Adams | G06F 3/0481 715/792 |
| 6,008,809 A | 12/1999 | Brooks | |
| 6,642,944 B2 | 11/2003 | Conrad et al. | |
| 6,686,852 B1 | 2/2004 | Guo | |
| 8,208,964 B2 | 6/2012 | Dobroth et al. | |
| 8,271,907 B2 | 9/2012 | Kim et al. | |
| 2003/0076362 A1 | 4/2003 | Terada | |
| 2004/0056903 A1 | 3/2004 | Sakai | |
| 2005/0235220 A1 | 10/2005 | Duperrouzel et al. | |
| 2007/0192726 A1 | 8/2007 | Kim et al. | |
| 2008/0109740 A1* | 5/2008 | Prinsen | G06F 3/0486 715/764 |
| 2008/0115081 A1* | 5/2008 | Sankaravadivelu | G06F 3/0481 715/783 |
| 2008/0172609 A1 | 7/2008 | Rytivaara | |
| 2008/0214239 A1 | 9/2008 | Hashimoto et al. | |
| 2008/0320396 A1 | 12/2008 | Mizrachi et al. | |
| 2009/0307631 A1 | 12/2009 | Kim et al. | |
| 2009/0322690 A1 | 12/2009 | Hiltunen et al. | |
| 2010/0062811 A1 | 3/2010 | Park et al. | |
| 2010/0088634 A1 | 4/2010 | Tsuruta et al. | |
| 2010/0138767 A1* | 6/2010 | Wang | G06F 3/0481 715/769 |
| 2010/0214278 A1 | 8/2010 | Miura | |
| 2010/0248788 A1 | 9/2010 | Yook et al. | |
| 2011/0078624 A1 | 3/2011 | Missig et al. | |
| 2011/0087982 A1* | 4/2011 | McCann | G06F 3/0481 715/769 |
| 2011/0087989 A1* | 4/2011 | McCann | G06F 3/04817 715/772 |
| 2011/0099512 A1 | 4/2011 | Jeong | |
| 2011/0105187 A1 | 5/2011 | Dobroth et al. | |
| 2011/0175930 A1* | 7/2011 | Hwang | G06F 3/0481 345/629 |
| 2011/0239156 A1 | 9/2011 | Lin | |
| 2012/0169768 A1 | 7/2012 | Roth et al. | |
| 2012/0176322 A1 | 7/2012 | Karmi et al. | |
| 2012/0185789 A1 | 7/2012 | Louch | |
| 2012/0210273 A1 | 8/2012 | Seong et al. | |
| 2012/0303476 A1 | 11/2012 | Krzyzanowski et al. | |
| 2013/0218464 A1* | 8/2013 | Chen | G01C 21/00 701/533 |

FOREIGN PATENT DOCUMENTS

| | | |
|---|---|---|
| CN | 101352057 A | 1/2009 |
| CN | 102129345 A | 7/2011 |
| CN | 102365617 A | 2/2012 |
| JP | 2-150919 A | 6/1990 |
| JP | 10-260784 A | 9/1998 |
| JP | 2004-46796 A | 2/2004 |
| JP | 2004-318566 A | 11/2004 |
| JP | 2006-073015 A | 3/2006 |
| JP | 2006-115213 A | 4/2006 |
| JP | 2007-257220 A | 10/2007 |
| JP | 2008-117181 A | 5/2008 |
| JP | 2008-134348 A | 6/2008 |
| JP | 2011-186741 A | 9/2011 |
| JP | 2012-521595 A | 9/2012 |
| KR | 10-0478920 B1 | 3/2005 |
| KR | 10-0650257 B1 | 11/2006 |
| KR | 10-0652626 B1 | 11/2006 |
| KR | 10-0700171 B1 | 3/2007 |
| KR | 10-2009-0016044 A | 2/2009 |
| KR | 10-2009-0024508 A | 3/2009 |
| KR | 10-0900295 B1 | 5/2009 |
| KR | 10-2010-0030968 A | 3/2010 |
| KR | 10-2010-0043613 A | 4/2010 |
| KR | 10-2010-0053823 A | 5/2010 |
| KR | 10-2010-0107377 A | 10/2010 |
| KR | 10-2011-0046191 A | 5/2011 |
| KR | 10-2012-0021925 A | 3/2012 |
| KR | 10-2012-0071590 A | 7/2012 |
| KR | 10-2012-0079271 A | 7/2012 |
| WO | 2008/090902 A1 | 7/2008 |
| WO | 2009/017175 A1 | 2/2009 |
| WO | 2009/028892 A2 | 3/2009 |

OTHER PUBLICATIONS

Korean Office Action dated Jun. 28, 2019, issued in the Korean Application No. 10-2013-0022422.
Korean Office Action dated Jul. 22, 2019, issued in the Korean Application No. 10-2013-0012077.
Korean Office Action dated Dec. 12, 2019, issued in Korean Application No. 10-2013-0022422.

* cited by examiner

FIG.10A

| B | ~1002 |
|---|---|
| L | ~1001 |
| C | ~1003 |
| D | ~1004 |

FIG.10B

| L | ~1001 |
|---|---|
| B | ~1002 |
| C | ~1003 |
| D | ~1004 |

FIG.10C

| E | ~1005 |
|---|---|
| L | ~1001 |
| B | ~1002 |
| C | ~1003 |
| D | ~1004 |

DISPLAY DEVICE AND METHOD OF CONTROLLING THE SAME

CROSS-REFERENCE TO RELATED APPLICATION(S)

This application claims the benefit under 35 U.S.C. § 119(e) of a U.S. provisional patent application filed on Dec. 6, 2012 in the U.S. Patent and Trademark Office and assigned Ser. No. 61/734,097, a U.S. provisional patent application filed on Dec. 14, 2012 in the U.S. Patent and Trademark Office and assigned Ser. No. 61/737,540, a U.S. provisional patent application filed on Dec. 21, 2012 in the U.S. Patent and Trademark Office and assigned Ser. No. 61/740,887, and under 35 U.S.C. § 119(a) of a Korean patent application filed on Feb. 1, 2013 in the Korean Intellectual Property Office and assigned Serial No. 10-2013-0012077, the entire disclosure of each of which is hereby incorporated by reference.

TECHNICAL FIELD

The present disclosure relates to a display device and a method for controlling the same. More particularly, the present disclosure relates to a display device and a method for controlling display of a window in which to run an application.

BACKGROUND

A desktop computer has at least one display device (e.g., a monitor). A mobile terminal that uses a touch screen, e.g., a cell phone, a smartphone, or a tablet Personal Computer (PC), has a single display device.

A user of the desktop computer may divide the screen of the display device e.g., horizontally or vertically with a plurality of pop-up windows depending on working environments. When a web browser is opened, the user may move upward or downward on the web browser using a page-up button or page-down button of the keyboard. Instead of the keyboard, the user may use a mouse to move upward or downward on the web page by scrolling a scroll bar on the side of the screen with the mouse cursor. In addition, the user may move to the top of the web page by selecting a 'top' button represented in a text form or as an icon at the bottom of the web page.

Compared with the desktop computer, the mobile terminal has a limited size screen as well as input constraints. Unlike the desktop computer, the mobile terminal has difficulty dividing the screen.

The mobile terminal may store and run default applications installed therein at a manufacturing stage and optional applications downloaded on the Internet from application sales sites. Optional applications may be developed by general developers and registered in the sales sites. In this respect, anyone can freely develop and sell his/her application through an application sales site to a user of a mobile terminal. Tens of thousands to hundreds of thousands of free or paid applications are now available for current mobile terminals.

Even though such various applications that interest consumers and satisfy their needs are available to the mobile terminal, the mobile terminal has difficulty presenting multiple applications because of its limited display size and User Interface (UI) constraint. Thus, the user may experience inconveniences in running the multiple applications in his/her mobile terminal.

Accordingly, a need exists for a technology to present multiple windows in a display of the mobile terminal. Another need exists for a technology to easily run and arrange multiple windows in a display of the mobile terminal.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a display device and a method for running and controlling arrangement of multiple windows in a display.

In accordance with an aspect of the present disclosure, a method for controlling a display device that includes a touch screen is provided. The method includes establishing a plurality of window display spaces in the touch screen, wherein each of the plurality of window display spaces displays a window for running an application, displaying a launcher application in one of the plurality of window display spaces, the launcher application presenting at least one icon to run at least one application, receiving in the launcher application a new application run command to run a new application, and displaying a new window for running the new application in one of the other window display spaces than the window display space where the launcher application is displayed, in response to the new application run command.

In accordance with another aspect of the present disclosure, a display device is provided. The display device includes a touch screen, and a controller configured to establish a plurality of window display spaces in the touch screen, wherein each of the plurality of window display spaces displays a window for running an application, and to control a launcher application to be displayed in one of the plurality of window display spaces, the launcher application presenting at least one icon to run at least one application, wherein the touch screen receives in the launcher application a new application run command to run a new application, and wherein the controller controls a new window for running the new application to be displayed in one of the other window display spaces than the window display space where the launcher application is displayed, in response to the new application run command.

In accordance with another aspect of the present disclosure, a method for controlling a display device that includes a touch screen is provided. The method includes establishing a plurality of window display spaces in the touch screen, wherein each of the plurality of window display spaces displays a window for running an application, setting and displaying a first window for running an application in a first window display space, one of the plurality of window display spaces, entering a window-position change mode to change window positions, receiving a window-position change command to change a position of the first window, and setting and displaying the first window in a second window display space different from the first window display space.

In accordance with another aspect of the present disclosure, a display device is provided. The display device includes a touch screen, and a controller configured to establish a plurality of window display spaces in the touch screen, wherein each of the plurality of window display spaces displays a window for running an application, and setting and displaying a first window for running an application in a first window display space, one of the plurality of the window display spaces, wherein in a window-position change mode to change window positions, the touch screen receives a window-position change command to change a position of the first window, and wherein the controller controls the first window to be placed and displayed in a second window display space different from the first window display space.

In accordance with another aspect of the present disclosure, a method for controlling a display device that includes a touch screen is provided. The method includes receiving a new application run command to run a new application in the touch screen, determining whether there is a center button for controlling display of windows for running applications, displaying a ghost view based on the determination, the ghost view showing in advance at least one of size, figure, and position of a new window for running the new application, and displaying the new window in response to the new application run command.

In accordance with another aspect of the present disclosure, a display device is provided. The display device includes a touch screen configured to receive a new application run command to run a new application, and a controller configured to determine whether there is a center button displayed in the touch screen for controlling display of windows for running applications, to control a ghost view to be displayed based on the determination, the ghost view showing in advance at least one of size, figure, and position of a new window for running the new application, and to control the new window to be displayed in response to the new application run command.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 10A, 10B, and 10C illustrate activity stacks according to embodiments of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
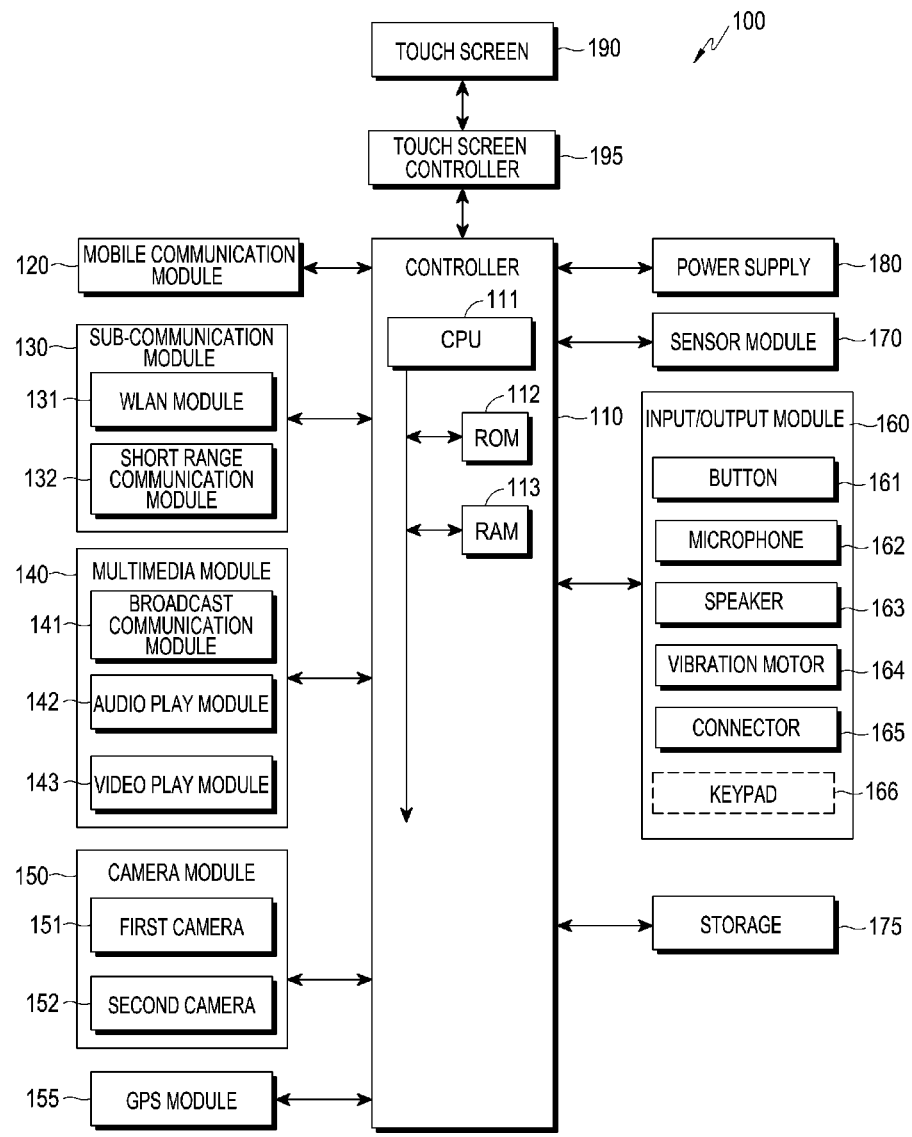
FIG. 1 is a schematic block diagram of an apparatus according to an embodiment of the present disclosure.

FIG. 1 is a schematic block diagram of an apparatus according to an embodiment of the present disclosure.

Referring to FIG. 1, an apparatus (also called 'display device') 100 may be connected to an external device (not shown) via a mobile communication module 120, a sub-communication module 130, and a connector 165. The "external device" includes another device, a cell phone, a smart phone, a tablet Personal Computer (PC), and a server, all of which are not shown.

Referring to FIG. 1, the display device 100 includes a touch screen 190 and a touch screen controller 195. The display device 100 also includes a controller 110, the mobile communication module 120, the sub-communication module 130, a multimedia module 140, a camera module 150, a Global Positioning System (GPS) module 155, an input/output module 160, a sensor module 170, a storage 175, and a power supply 180. The sub-communication module 130 includes at least one of Wireless Local Area Network (WLAN) 131 and a short-range communication module 132, and the multimedia module 140 includes at least one of a broadcast communication module 141, an audio play module 142, and video play module 143. The camera module 150 includes at least one of a first camera 151 and a second camera 152, and the input/output module 160 includes at least one of buttons 161, a microphone 162, a speaker 163, a vibration motor 164, the connector 165, and a keypad 166.

The controller 110 may include a Central Processing Unit (CPU) 111, a Read Only Memory (ROM) 112 for storing a control program to control the display device 100, and a Random Access Memory (RAM) 113 for storing signals or data input from an outside or for being used as a memory space for working results in the display device 100. The CPU 111 may include a single core, dual cores, triple cores, or quad cores. The CPU 111, ROM 112, and RAM 113 may be connected to each other via an internal bus.

The controller 110 may control the mobile communication module 120, the sub-communication module 130, the multimedia module 140, the camera module 150, the GPS module, the input/output module 160, the sensor module 170, the storage 175, the power supply 180, the touch screen 190 (that may consist of a first and second touch screens), and the touch screen controller 195.

The mobile communication module 120 connects the display device 100 to an external device through mobile communication using at least one-one or more-antennas (not shown) under control of the controller 110. The mobile communication module 120 transmits/receives wireless signals for voice calls, video conference calls, Short Message Service (SMS) messages, or Multimedia Message Service (MMS) messages to/from a cell phone (not shown), a smart phone (not shown), a tablet PC (not shown), or another device not shown), the phones having phone numbers entered into the display device 100.

The sub-communication module 130 may include at least one of the WLAN module 131 and the short-range communication module 132. For example, the sub-communication module 130 may include either the WLAN module 131 or the short-range communication module 132, or both.

The WLAN module 131 may be connected to the Internet in a place where there is an Access Point (AP) (not shown), under control of the controller 110. The WLAN module 131 supports Institute of Electrical and Electronic Engineers' (IEEE's) WLAN standard IEEE802.11x. The short-range communication module 132 may perform short-range communication between the display device 100 and an image rendering device (not shown) under control of the controller 110. The short-range communication may include Bluetooth, Infrared Data Association (IrDA), Zigbee, and the like.

The display device 100 may include at least one of the mobile communication module 120, the WLAN module 131 and the short-range communication module 132 based on the performance. For example, the display device 100 may include a combination of the mobile communication module 120, the WLAN module 131 and the short-range communication module 132 based on the performance.

The multimedia module 140 may include the broadcast communication module 141, the audio play module 142, or the video play module 143. The broadcast communication module 141 may receive broadcast signals (e.g., television broadcast signals, radio broadcast signals, or data broadcast signals) and additional broadcast information (e.g., Electric Program Guide (EPG) or Electric Service Guide (ESG)) transmitted from a broadcasting station through a broadcast communication antenna (not shown) under control of the controller 110. The audio play module 142 may play digital audio files (e.g., files having extensions, such as mp3, wma, ogg, or way) stored or received under control of the controller 110. The video play module 143 may play digital video files (e.g., files having extensions, such as mpeg, mpg, mp4, avi, move, or mkv) stored or received under control of the controller 110. The video play module 143 may also play digital audio files.

The multimedia module 140 may include the audio play module 142 and the video play module 143 except for the broadcast communication module 141. The audio play module 142 or video play module 143 of the multimedia module 140 may be included in the controller 100.

The camera module 150 may include at least one of the first and second cameras 151 and 152 for capturing still images or video images under control of the controller 110. Furthermore, the first or second camera 151 or 152 may include an auxiliary light source (e.g., flash (not shown)) for providing an amount of light needed for capturing. The first camera 151 may be placed on the front of the display device 100 and the second camera 152 may be placed on the back of the display device 100. In another way, the first and second cameras 151 and 152 are arranged adjacent to each other (e.g., the distance between the first and second cameras 151 and 152 may be within the range between 1 to 8 cm), capturing 3 Dimensional (3D) still images or 3D video images.

The GPS module 155 receives radio signals from a plurality of GPS satellites (not shown) in Earth's orbit, and may calculate the position of the display device 100 by using time of arrival from the GPS satellites to the display device 100.

The input/output module 160 may include at least one of a plurality of buttons 161, the microphone 162, the speaker 163, the vibration motor 164, the connector 165, and the keypad 166.

The at least one of buttons 161 may be arranged on the front, side, or back of the housing of the display device 100, and may include at least one of power/lock button (not shown), volume button (not shown), menu button, home button, back button, and search button.

The microphone 162 generates electric signals by receiving voice or sound under control of the controller 110.

The speaker 163 may output sounds corresponding to various signals (e.g., radio signals, broadcast signals, digital audio files, digital video files or photography signals) from the mobile communication module 120, sub-communication module 130, multimedia module 140, or camera module 150 to the outside under control of the controller 110. The speaker 163 may output sounds (e.g., button-press sounds or ringback tones) that correspond to functions performed by the display device 100. There may be one or multiple speakers 163 arranged in a proper position or proper positions of the housing of the display device 100.

The vibration motor 164 may convert an electric signal to a mechanical vibration under control of the controller 110. For example, the display device 100 in a vibrating mode drives the vibration motor 164 when receiving a voice call from another device (not shown). There may be one or more vibration motors 164 inside the housing of the display device 100. The vibration motor 164 may be driven in response to a touch activity or continuous touches of a user over the touch screen 190.

The connector 165 may be used as an interface for connecting the display device 100 to the external device (not shown) or a power source (not shown). Under control of the controller 110, data stored in the storage 175 of the display device 100 may be transmitted to the external device via a cable connected to the connector 165, or data may be received from the external device. Power may be supplied by the power source via a cable connected to the connector 165 or a battery (not shown) may be charged.

The keypad 166 may receive key inputs from the user to control the display device 100. The keypad 166 includes a physical keypad (not shown) formed in the display device 100, or a virtual keypad (not shown) displayed on the touchscreen 190. The mechanical keypad formed in the display device 100 may be excluded depending on the performance or structure of the display device 100.

The sensor module 170 includes at least one sensor for detecting a status of the display device 100. For example, the sensor module 170 may include a proximity sensor for detecting proximity of the user to the display device 100, an illumination sensor for detecting an amount of ambient light, or a motion sensor (not shown) for detecting an operation of the display device 100 (e.g., rotation of the display device 100, acceleration or vibration imposed on the display device 100). At least one sensor may detect the status and generate a corresponding signal to transmit to the controller 110. The sensor of the sensor module 170 may be added or removed depending on the performance of the display device 100.

The storage 175 may store signals or data input/output according to operations of the mobile communication module 120, the sub-communication module 130, the multimedia module 140, the camera module 150, the GPS module, the input/output module 160, the sensor module 170, the touch screen 190 under control of the controller 110. The storage 175 may store the control programs and applications for controlling the display device 100 or the controller 110.

The term "storage" implies not only the storage 175, but also the ROM 112, RAM 113 in the controller 110, or a memory card (not shown) (e.g., a Secure Digital (SD) card, a memory stick, and the like) installed in the display device 100. The storage may also include a non-volatile memory, volatile memory, Hard Disc Drive (HDD), Solid State Drive (SSD), or the like.

The power supply 180 may supply power to one or more batteries (not shown) placed inside the housing of the display device 100 under control of the controller 110. The one or more batteries power the display device 100. The power supply 180 may supply the display device 100 with the power input from the external power source (not shown) via a cable connected to the connector 165.

The touchscreen 190 may provide the user with a user interface for various services (e.g., a call, a data transmission, broadcasting, photography services). The touchscreen 190 may send an analog signal corresponding to at least one touch input to the user interface to the touchscreen controller 195. The touch screen 190 may receive the at least one touch from user's physical contact (e.g., with fingers including thumb) or via a touchable input device (e.g., a stylus pen). The touchscreen 190 may receive consecutive moves of one of the at least one touch. The touch screen 190 may send an analog signal corresponding to the consecutive moves of the input touch to the touchscreen controller 195.

Touches in the present disclosure are not limited to physical touches by a physical contact of the user or contacts with the touchable input means, but may also include touchless (e.g., keeping a detectable distance less than 1 mm between the touch screen 190 and the user's body or touchable input means). The detectable distance from the touch screen 190 may vary depending on the performance or structure of the display device 100.

The touch screen 190 may be implemented in e.g., a resistive way, capacitive way, infrared way, or acoustic wave way.

The touch screen controller 195 converts the analog signal received from the touch screen 190 to a digital signal (e.g., XY coordinates) and transmits the digital signal to the controller 110. The controller 110 may control the touch screen 190 by using the digital signal received from the touch screen controller 195. For example, in response to the touch, the controller 110 may enable a shortcut run icon (not shown) displayed on the touchscreen 190 to be selected or to be executed. The touch screen controller 195 may also be incorporated in the controller 110.

FIGS. 2A, 2B, 2C, 2D, 2E, 2F, 2G, 2H, 2I, 2J, and 2K illustrate how to open windows according to embodiments of the present disclosure. It is understood that a display device 200 may be implemented not only as a mobile device as shown in FIG. 1 but also as any of other devices in various forms, such as a television, an Internet television, or medical data display device. In other words, the display device may not be limited to any particular device but may be any device that includes a means to display rendered images.

Figure 2A:
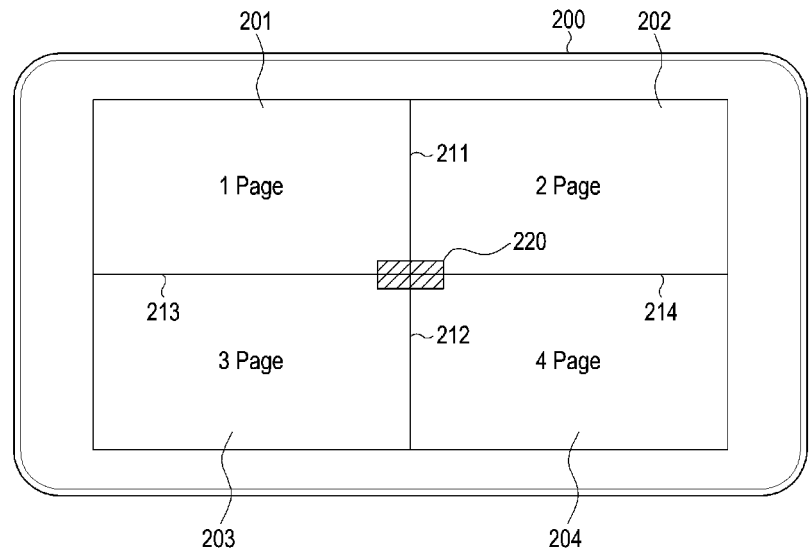
FIGS. 2A, 2B, 2C, 2D, 2E, 2F, 2G, 2H, 2I, 2J, and 2K illustrate how to open windows according to embodiments of the present disclosure.

Referring to FIGS. 2A, 2B, 2C, 2D, 2E, 2F, 2G, 2H, 2I, 2J, and 2K, the display device 200 may establish a plurality of window display spaces 201 to 204 on the touch screen. More specifically, a controller of the display device 200 may establish a first section 201, a second section 202, a third section 203, and a fourth section 204. The controller may also set up a first border line 211 between the first section 201 and the second section 202, a second border line 212 between the third section 203 and the fourth section 204, a third border line 213 between the first section 201 and the third section 203, and a fourth border line 214 between the second section 202 and the fourth section 204. The first border line 211 and the second border line 212 may constitute a straight line and the third border line 213 and the fourth border line 214 may constitute another straight line. The controller sets up the first to fourth sections 201 to 204 not to overlap each other. For example, as shown in FIG. 2A, the controller sets up the first section 201 in the upper left side of the screen, the second section 202 in the upper right side, the third section 203 in the lower left side, and the fourth section 204 in the lower right side. The controller first sets up the first and second border lines 211 and 212 to divide the screen into left and right halves, and sets up the third and fourth border lines 213 and 214 to divide the screen into upper and lower halves.

The controller displays a center button 220 at an intersection of the first, second, third and fourth border lines 211, 212, 213, and 214. The center button 220 may be a function key to offer a function of changing the size of a space for displaying an application or enter a window-position change mode.

The controller controls a respective window for running an application to be placed and displayed in each of the sections 201 to 204. For example, the controller controls windows to be displayed in the sections 201 to 204, respectively, as shown in 2B, 2C, 2D, 2E, 2F, 2G, 2H, 2I, 2J, and 2K.

Each window may include a running screen, a title bar, and a control area of the particular application. On the running screen of the application, objects associated with the application may be displayed. The objects may be formed of various things, such as a text, figures, icons, buttons, checkboxes, photos, videos, webs, maps, and the like. When the object is touched by the user, a function or event for the object may be performed in the application. The object may be called a view in some operating systems. The title bar may include at least one control key to control display of the window. For example, the control key may be a window display minimize button, a window display maximize button, and a window close button.

In the meantime, the applications are programs implemented independently from each other by a manufacturer of the display device 200 or an application developer. Thus, one application to run does not need another application to be running in advance. And, when one application is closed, another application may keep running.

Those applications are distinguished from composite applications (or dual applications) that combines various functions, e.g., a video application combined with some other functions provided by other applications (e.g., a memo function and a message communication function), in that the applications are independently implemented programs. The composite application is manufactured as a new single application to have various functions. However, the composite application is usually a paid application, and even if the user purchased and installed the composite application, functions provided by the composite application are relatively limited compared with those provided by independent individual applications.

Figure 2B:
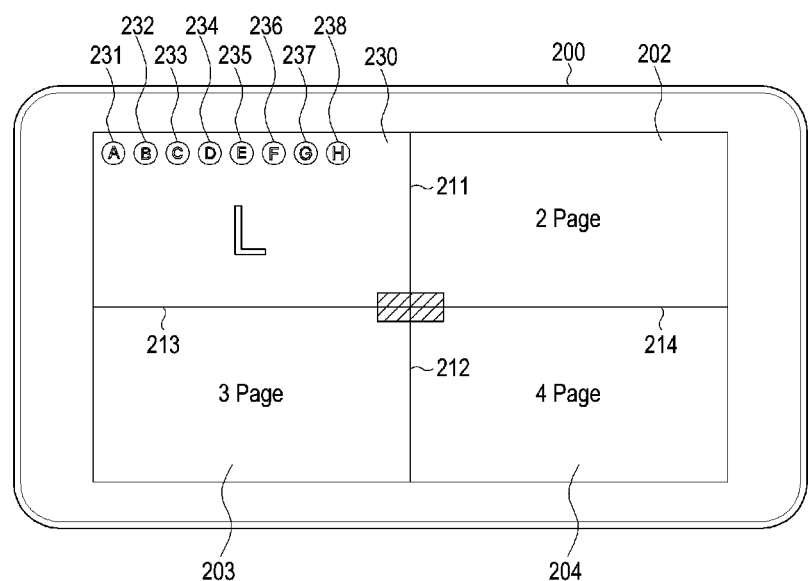

Referring to FIG. 2B, the controller controls a window 230 for running a launcher application to be displayed in the first section 201. The launcher application provides application icons 231 to 238 to run respective applications. When an application run command is inputted by touching one of the application icons 231 to 238, the launcher application displays an application that corresponds to the touched icon in one of the first to fourth sections 201 to 204.

FIGS. 3A, 3B, 3C, 3D, 3E, 3F, 3G, 3H, and 3I illustrate activity stacks according to embodiments of the present disclosure.

Figure 3A:
FIGS. 3A, 3B, 3C, 3D, 3E, 3F, 3G, 3H, and 3I illustrate activity stacks according to embodiments of the present disclosure.

Referring to FIGS. 3A, 3B, 3C, 3D, 3E, 3F, 3G, 3H, and 3I, in this regard, a reference to an activity stack of FIG. 3A managed by the display device 200, will be also made. As the launcher application runs, the controller creates and manages a launcher application stack 301 in an activity stack.

Figure 2C:
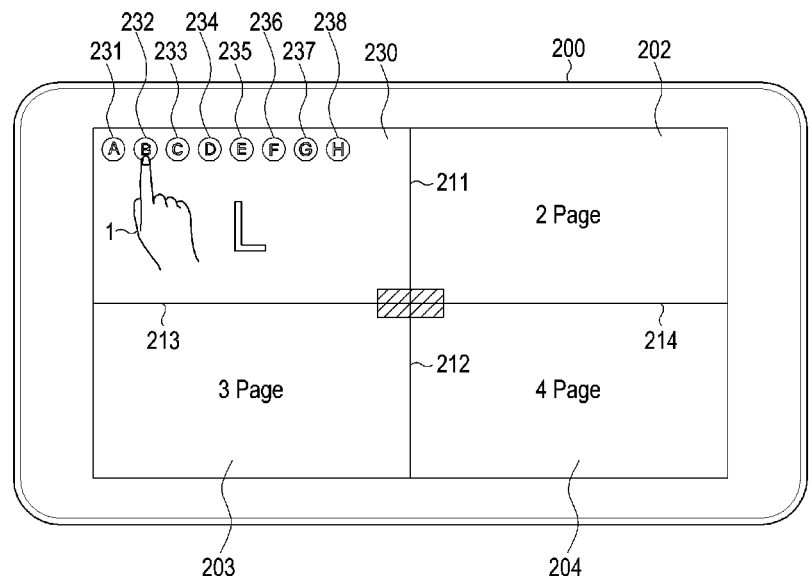

Referring to FIG. 2C, a user 1 may touch an icon for application B. When the icon for application B is touched, the controller controls a second window 240 for running the application B to be displayed in the second section 202. The controller may determine window display spaces for windows in a sequence. For example, the controller may control new windows to be displayed in a clockwise direction, i.e., in the sequence from the second section 202, to the third section 203, and to the fourth section 204. Such a sequence is by way of example only, and the controller may also control the new windows to be displayed in a counter-clockwise direction. The sequence of displaying new windows may vary.

Figure 2D:
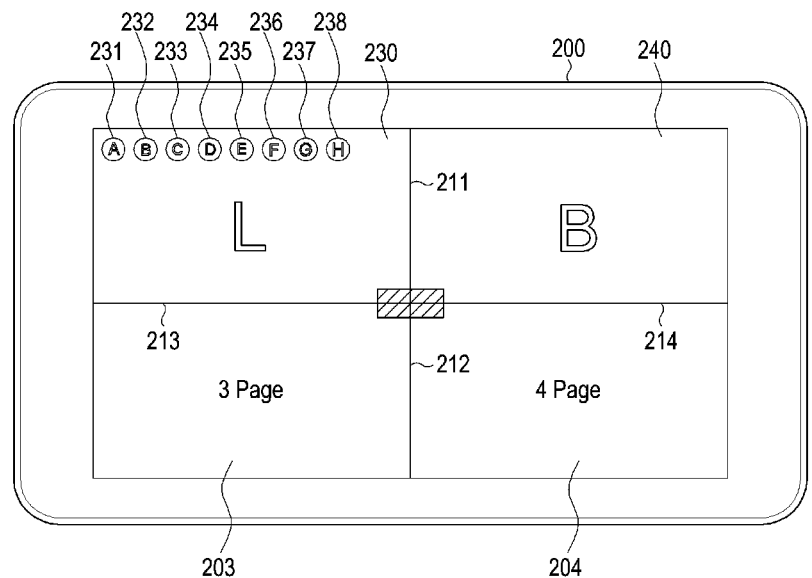
Figure 3B:
Figure 3C:
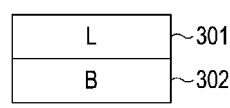

A reference to an activity stack of FIG. 3B will be made to describe an embodiment in connection with FIG. 2D. As the application B runs, the controller creates a B application stack 302 in the activity stack. In this regard, the controller puts the B application stack 302 on top of the launcher application stack 301. This means that the application B has a higher activity stack level than an activity stack level of the launcher application.

Figure 2E:
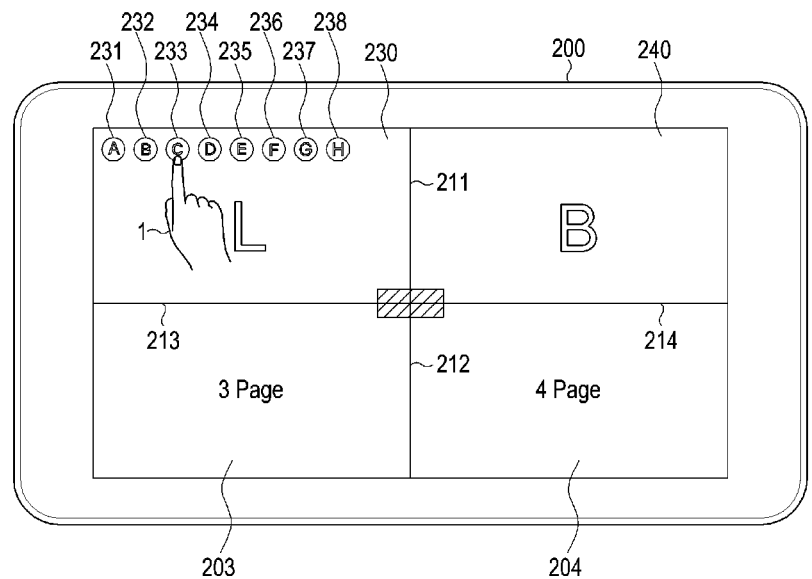

Referring to FIG. 2E, the user 1 may touch an icon 233 for application C. In this regard, a reference to an activity stack of FIG. 3C will be made. Since the user 1 inputted an application run command in the launcher application, the launcher application stack comes on top of the B application stack in the activity stack, which means that the launcher application's activity stack level is higher than the application B's activity stack level.

Figure 2F:
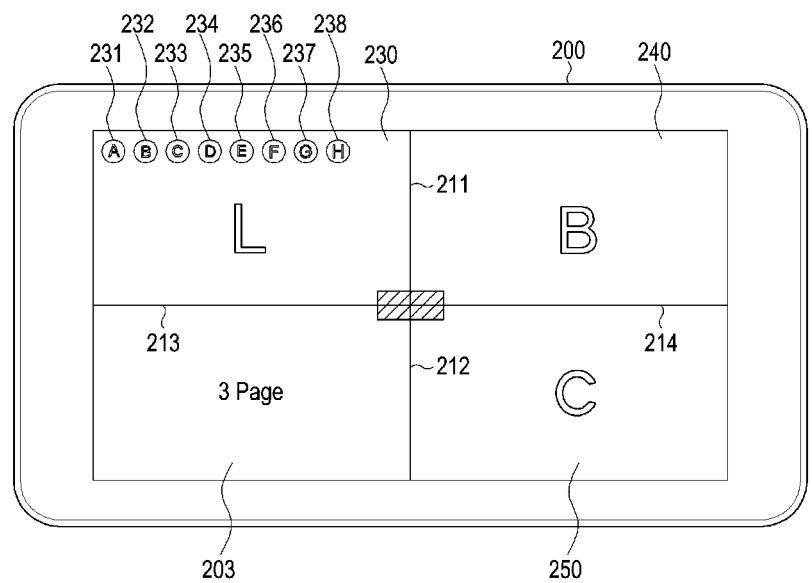

When the icon 233 for application C is touched, the controller controls a third window 250 for running the application C to be displayed in the fourth section 204, as shown in FIG. 2F.

Figure 2G:
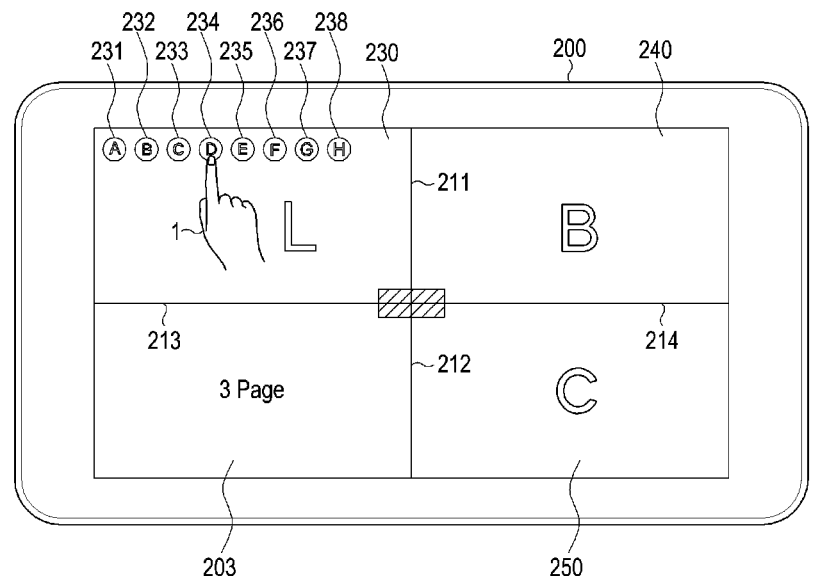
Figure 3D:
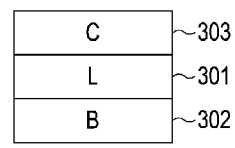
Figure 3E:
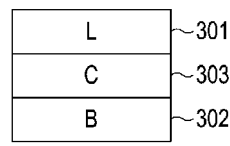

A reference to an activity stack of FIG. 3D will be made to describe an embodiment in connection with FIG. 2F. As the application C runs, the controller creates a C application stack 303 in the activity stack. In this regard, the controller puts the latest C application stack 303 on top of the launcher application stack 301. This means that the application C has a higher activity stack level than the activity stack level of the launcher application. Referring to FIG. 2G, the user 1 may touch an icon 234 for application D. In this regard, a reference to an activity stack of FIG. 3E will be made. Since the user 1 inputted an application run command in the launcher application, the launcher application stack comes on top of the C application stack in the activity stack, which means that the launcher application's activity stack level is higher than the application C's activity stack level.

Figure 2H:
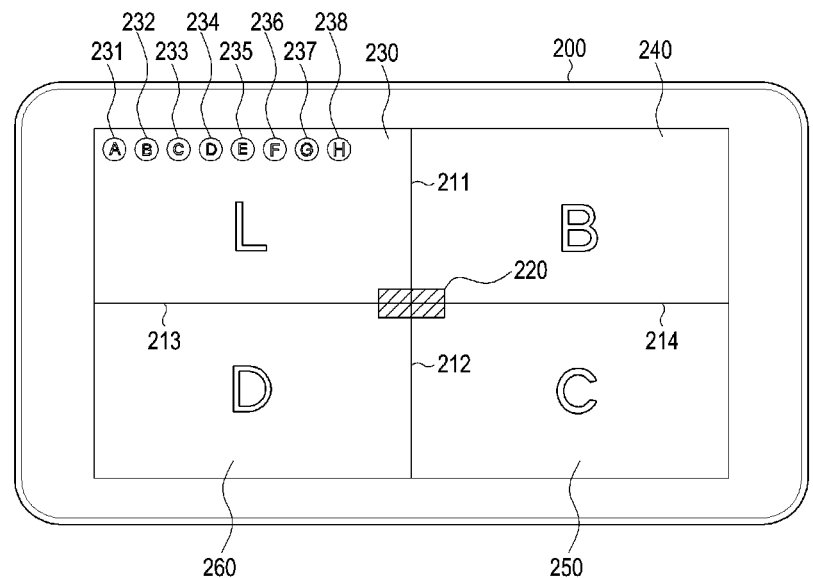

When the icon 234 for application D is touched, the controller controls a fourth window 260 for running the application D to be displayed in the third section 203, as shown in FIG. 2H.

Figure 3F:
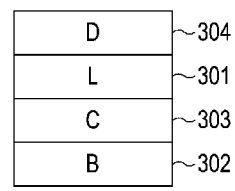
Figure 3G:
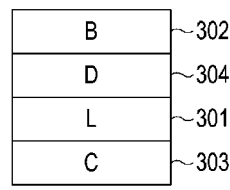
Figure 3H:
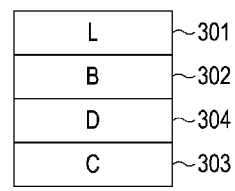

A reference to an activity stack of FIG. 3F will be made to describe an embodiment in connection with FIG. 2H. As the application D runs, the controller creates a D application stack 304 in the activity stack. In this regard, the controller puts the latest D application stack 304 on top of the launcher application stack 301. This means that the application D has a higher activity stack level than the activity stack level of the launcher application.

Figure 2I:
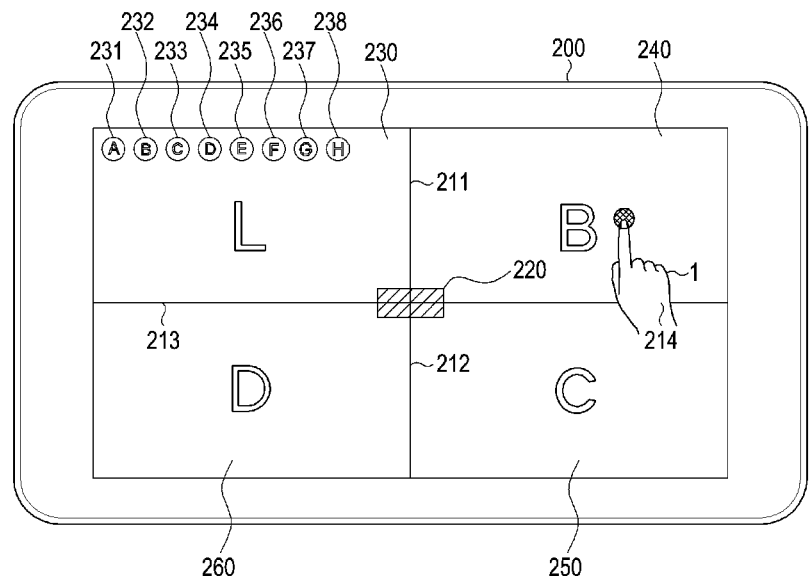
Figure 2J:
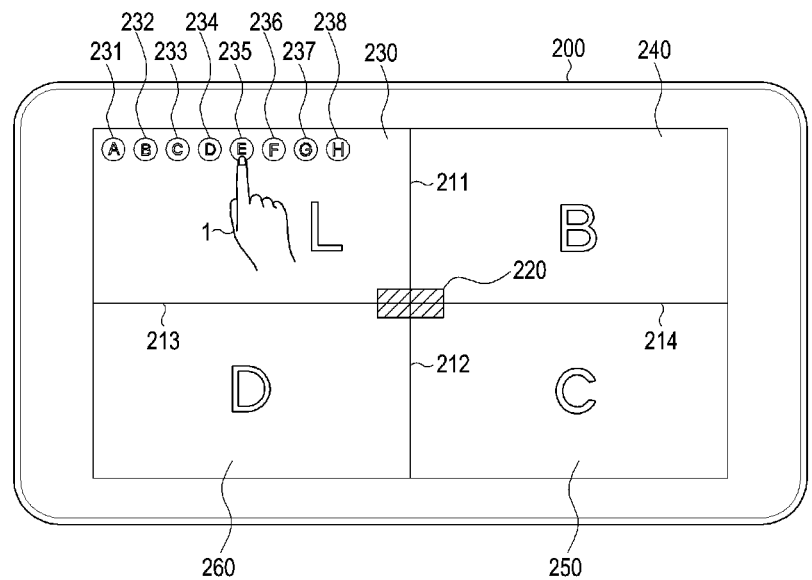

In the meantime, the user 1 may manipulate the application B, as shown in FIG. 2I. In this regard, a reference to an activity stack of FIG. 3G will be made. In response to the user input to the application B, the controller puts the B application stack 302 on the top because the application B ran most recently. Referring to FIG. 2J, the user 1 may touch an icon 235 for application E. In this regard, a reference to an activity stack of FIG. 3H will be made. Since the user 1 inputted an application run command in the launcher application, the launcher application stack comes on top of the D application stack in the activity stack, which means that the launcher application's activity stack level is higher than the application D's activity stack level.

Figure 2K:
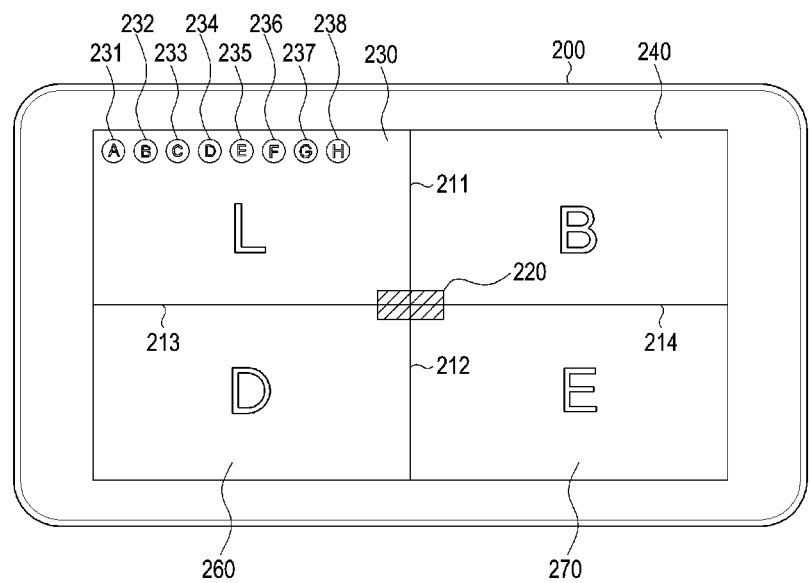

When the icon 235 for application E is touched, the controller controls a fifth window 270 for running the application E to be displayed in the fourth section 204, as shown in FIG. 2K. The controller may refer to an activity stack of FIG. 3H, if there is no empty widow display space. From the activity stack, the controller may identify which application has the lowest activity stack level. For example, referring to FIG. 3H, the controller may determine that the application C has the lowest activity stack level. The controller controls the fifth window 270 for running the application E to be displayed in the fourth section 204 that has just displayed the application C having the lowest activity stack level.

Figure 3I:
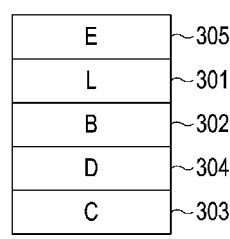

In this regard, a reference to an activity stack of FIG. 3I will be made. As the application E runs, the controller creates an E application stack 305 in the activity stack. In this regard, the controller puts the latest E application stack 305 on top of the launcher application stack 301. This means that the application E has a higher activity stack level than the activity stack level of the launcher application.

Figure 4:
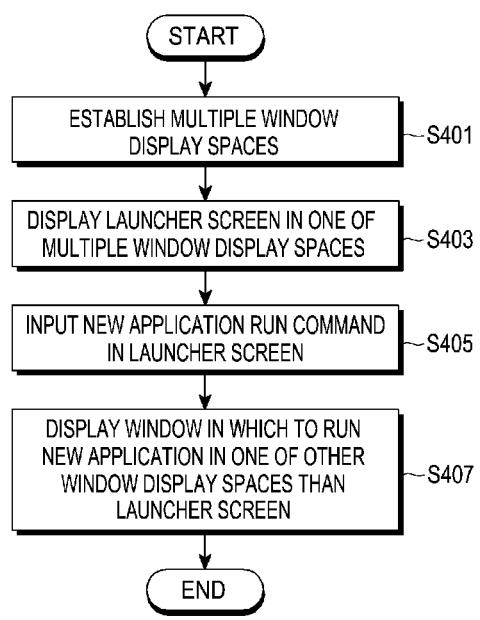
FIG. 4 is a flowchart illustrating a method for controlling a display device according to an embodiment of the present disclosure.

FIG. 4 is a flowchart illustrating a method for controlling a display device according to an embodiment of the present disclosure.

Referring to FIG. 4, the display device may establish a plurality of window display spaces e.g., as shown in FIG. 2A, in operation S401. The display device runs a launcher application for running new applications in one of the plurality of window display spaces, in operation S403. More specifically, the display device displays a window for running the launch application in one of the plurality of window display spaces.

The display device may receive a command in the launch application window to launch a new application, in operation S405. For example, as shown in FIG. 2C, a command to launch a new application (referred to as a new application run command) may be entered by touching an icon for the new application.

In operation S407, the display device may display a window for running the new application in one of the window display spaces except where the launcher application is running.

Figure 5:
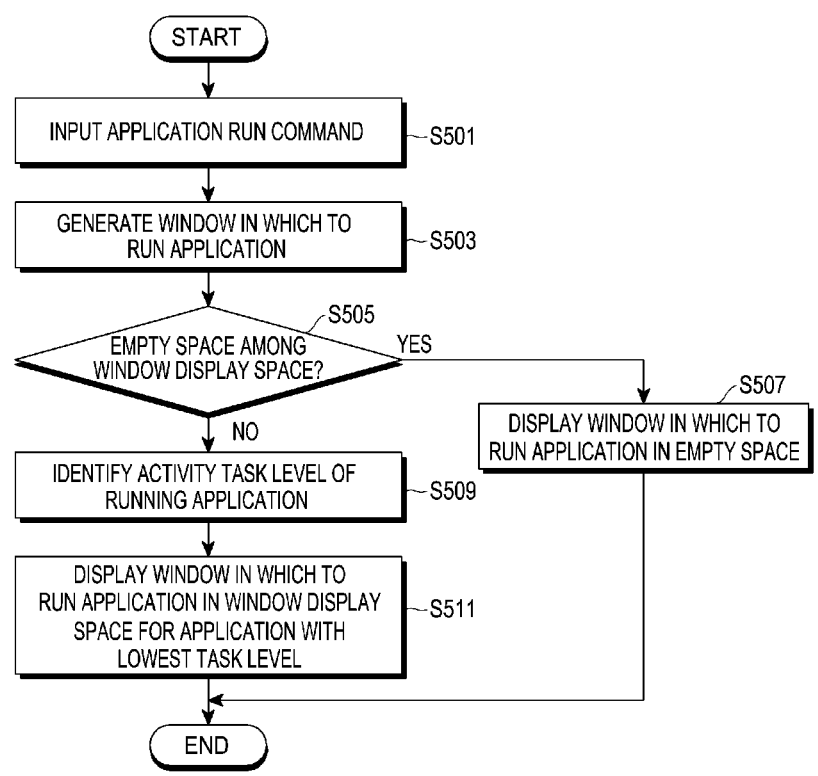
FIG. 5 is a flowchart illustrating a method for controlling a display device according to an embodiment of the present disclosure.

FIG. 5 is a flowchart illustrating a method for controlling a display device according to an embodiment of the present disclosure.

Referring to FIG. 5, the display device may receive a new application run command, in operation S501. For example, as shown in FIG. 2C, the new application run command may be entered by touching an icon for the new application. The display device may create a window for running the new application, in operation S503.

The display device may determine whether there is an empty space for the new window among window display spaces, in operation S505. If there is an empty space in operation S505, the display device may display the new window in the empty space, in operation S507. If it is determined that there are multiple empty spaces among the window display spaces, in operation S505, the display device may display the new window in one of the multiple empty spaces based on the sequence as described above.

If there is no empty space in operation S505, the display device may determine an activity stack level of any running application(s) in operation S509. The display device may display the new window in a window display space occupied by an application that has the lowest activity stack level, in operation S511.

Figure 6A:
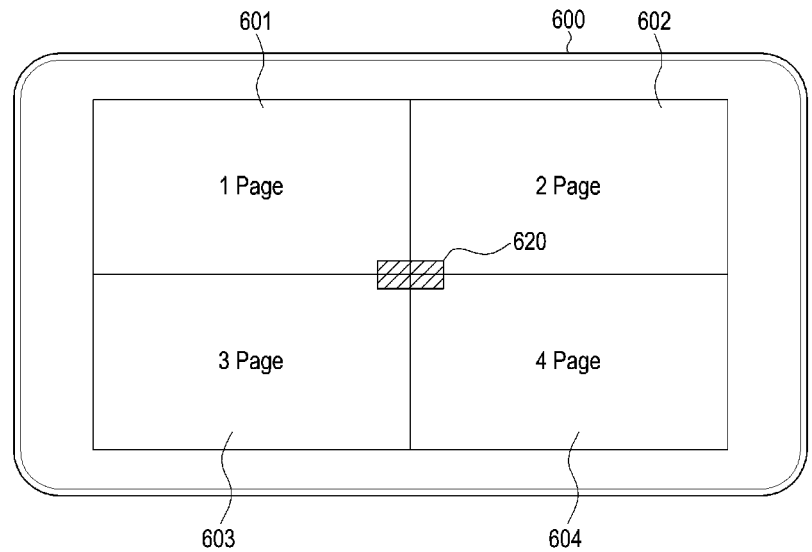
FIGS. 6A, 6B, and 6C illustrate how to open windows according to embodiments of the present disclosure.
Figure 6B:
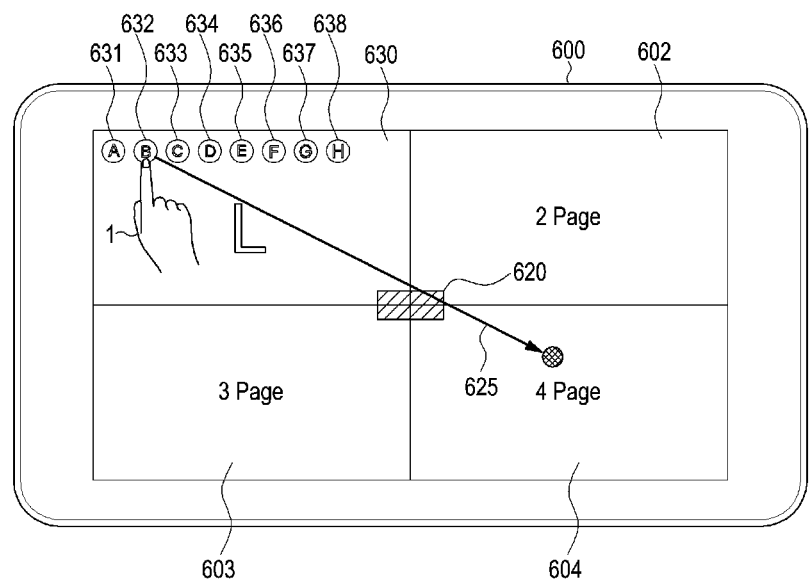
Figure 6C:
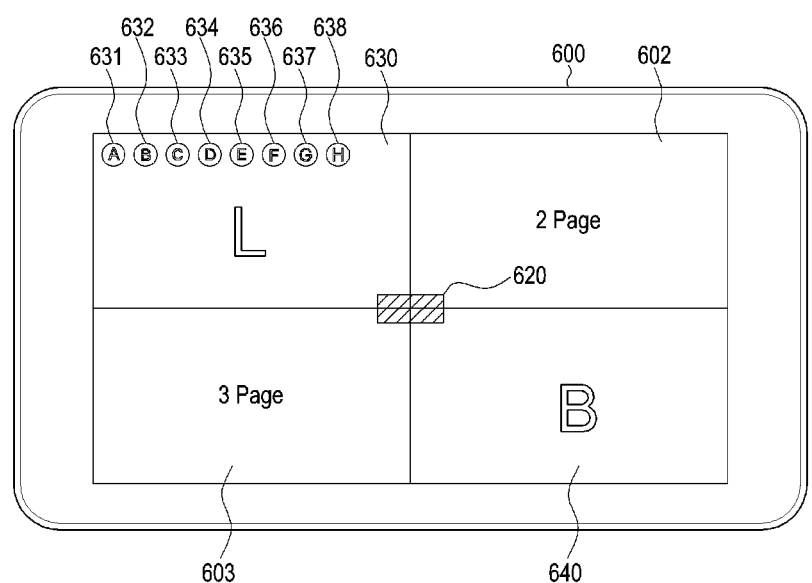

FIGS. 6A, 6B, and 6C illustrate how to open windows according to embodiments of the present disclosure.

Referring to FIGS. 6A, 6B, and 6C, a display device 600 displays a first window, a second window, a third window, and a fourth window in first to fourth sections (601, 602, 603, 604), respectively. The controller displays a center button 620 at an intersection of the first, second, third and fourth sections 601, 602, 603, and 604. The controller controls a window 630 for running a launcher application to be displayed in a first section 601. The launcher application presents application icons 631 to 638 for launching respective applications, as shown in FIG. 6B.

The user 1 may make a drag gesture 625 that drags one of the application icons 631 to 638 into a desired window display space, e.g., a fourth section 604, as shown in FIG. 6B. Accordingly, a display device 600 controls a second window 640 for running the application B to be displayed in the fourth section 604, as shown in FIG. 6C.

Figure 7:
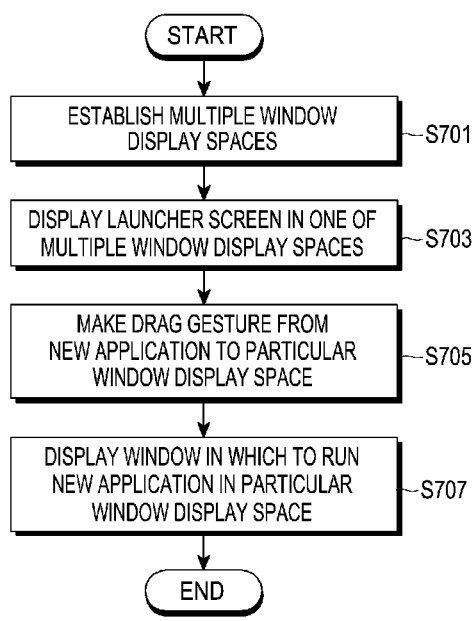
FIG. 7 is a flowchart illustrating a method for controlling a display device according to an embodiment of the present disclosure.

FIG. 7 is a flowchart illustrating a method for controlling a display device according to an embodiment of the present disclosure.

Referring to FIG. 7, the display device may establish a plurality of window display spaces e.g., as shown in FIG. 2A, in operation S701. The display device runs a launcher application to launch a new application in one of the plurality of window display spaces, in operation S703. More specifically, the display device displays a window for running the launch application in one of the plurality of window display spaces.

The display device may receive a new application run command in the launch application window, in operation S705. For example, the display device may receive a gesture that drags an icon for an application, e.g., the application B, to one of the plurality of window display spaces, as shown in FIG. 6B.

In operation S707, the display device may display a window in which the application corresponding to the dragged icon is running in a window display space in which the drag gesture ends.

FIGS. 8A, 8B, 8C, 8D, 8E, 8F, 8G, 8H, 8I, 8J, 8K, 8L, and 8M illustrate how to display multiple windows according to embodiments of the present disclosure.

Referring to FIGS. 8A, 8B, 8C, 8D, 8E, 8F, 8G, 8H, 8I, 8J, 8K, 8L, and 8M, a display device 800 displays a menu screen 817. The menu screen 817 may be a screen for a running launcher program, including different icons to launch different applications. The menu screen 817 may also include information of current time and optionally various widgets. The display device 800 displays a tray 810 that includes icons 811 to 816 for runnable applications on the left of the touch screen.

Figure 8A:
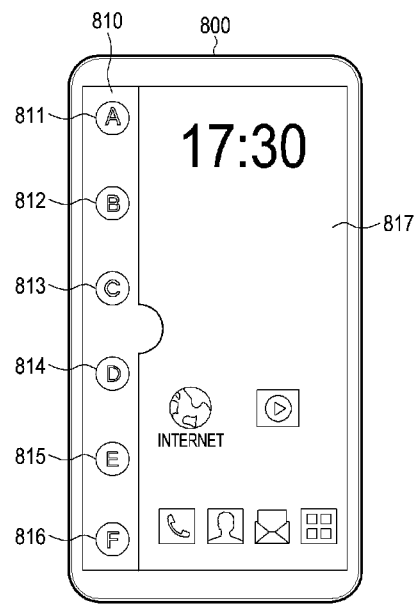
FIGS. 8A, 8B, 8C, 8D, 8E, 8F, 8G, 8H, 8I, 8J, 8K, 8L, and 8M illustrate how to display multiple windows according to embodiments of the present disclosure.
Figure 8B:
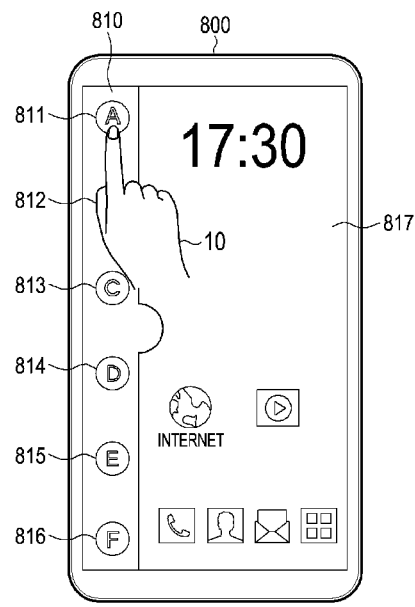
Figure 8C:
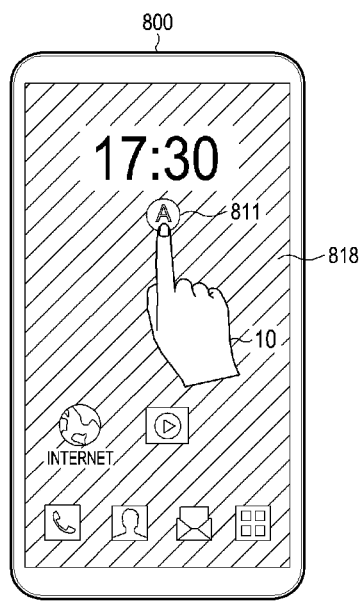

A user 10 may manipulate the display device 800 in order to run a first application A, as shown in FIG. 8B. For example, the user 10 touches an icon 811 for the first application A and makes a drag gesture into the menu screen 817 as shown in FIG. 8C. The controller may control the icon 811 to be displayed on the point where the user 10 touches. The controller may also control a ghost view 818 to be displayed around the point where the user 10 touches. The ghost view 818 refers to a view that presents a runnable size and figure of a window for running the application in advance in order for the user to select where to place the window. The controller may control the ghost view 818 to be displayed in full screen as no window is presented. The controller may control the ghost view to be displayed in full screen if no window is presented on the touch screen. The controller may control the ghost view to be displayed in half a size and figure of the touch screen if there is one window presented in the touch screen. The controller may control the ghost view to be displayed in half a size and figure of one of two windows if the two windows are presented in the touch screen. This will be described with reference to FIG. 8R. The controller may control the ghost view to be displayed in half a size and figure of one of three windows that has the greatest size, if the three windows are presented in the touch screen. This will also be described with reference to FIG. 8R.

Figure 8D:
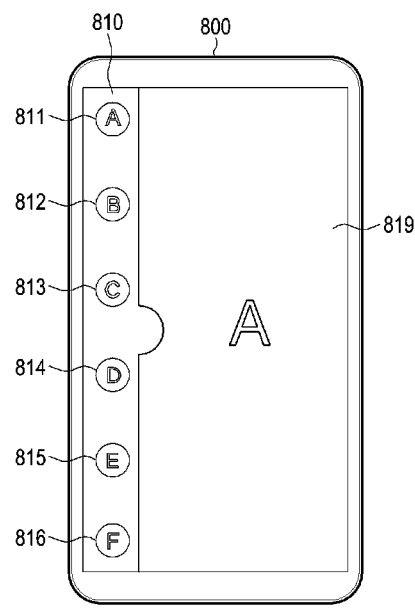

The controller may recognize the drag gesture as a new application run command to launch a new application. The controller may create a first window 819 for running the first application A. The controller may control the first window 819 to be displayed in full screen, as shown in FIG. 8D.

Figure 8E:
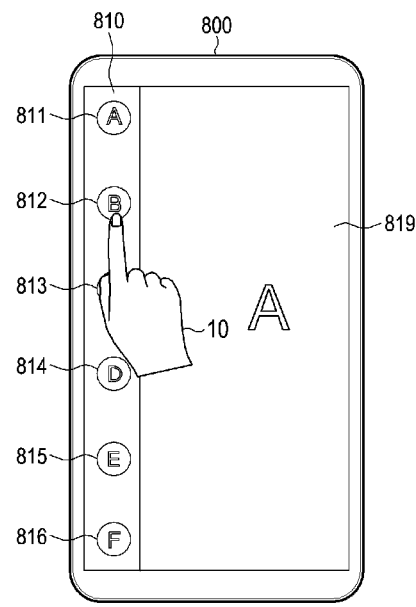
Figure 8F:
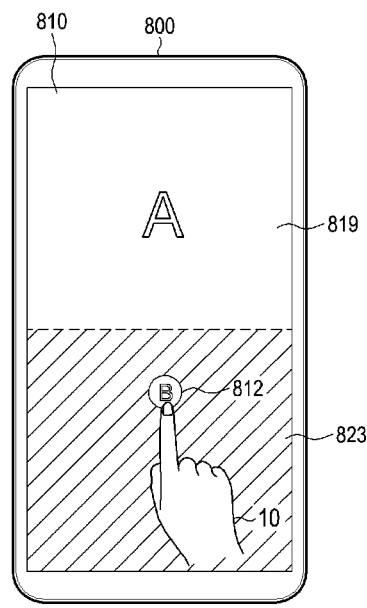

A user 10 may manipulate the display device 800 in order to run an additional second application B. For example, the user 10 may touch an icon 812 for the second application B as shown in FIG. 8E and drag the icon 812 down to a lower part of the first window 819 as shown in FIG. 8F. The controller controls the icon 812 to be displayed on the point where the user 10 touches. The controller may also control a ghost view 823 to be displayed around the point where the user 10 touches. As described above, since a single window, i.e., the window 819 is displayed in the touch screen, the controller may control the ghost view 823 to be displayed in half a size and figure of the touch screen. Although not shown, if the point where the user 10 touches is somewhere in the upper half of the touch screen, it will be obvious that the controller controls the ghost view to be displayed not in the lower half but in the upper half of the touch screen. The ghost view being displayed in the lower half, as shown in FIG. 8F is by way of example only, but the controller may also divide the touch screen into left and right halves and control the ghost view to be displayed in one of the left and right halves.

Figure 8G:
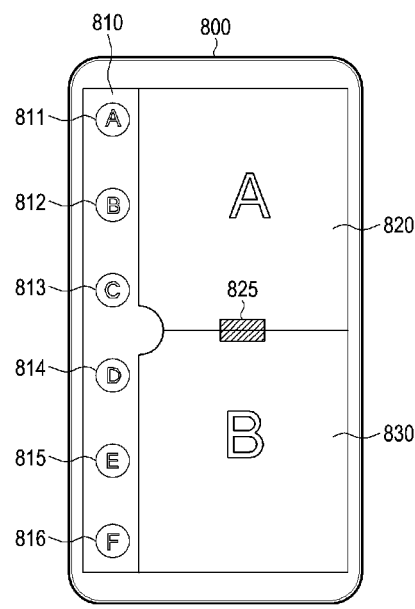

If the user's 10 drag gesture ends at somewhere in the lower half of the touch screen as shown in FIG. 8F, the controller determines that a new application run command has been entered. As shown in FIG. 8G, the controller controls a second window 830 to be displayed in the lower half of the touch screen that corresponds to the ghost view 823 of FIG. 8F. At this time, the controller controls the size and figure of the first window 820 to be reduced and displayed to fit the upper half of the touch screen. The controller also generates a center button 825 and displays the center button 825 on the border line between the first window 820 and the second window 830.

Figure 8H:
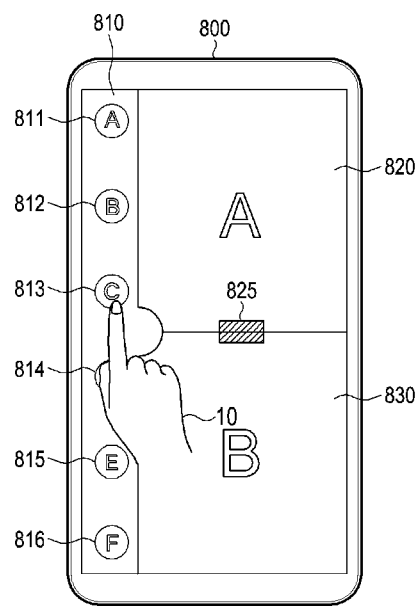
Figure 8I:
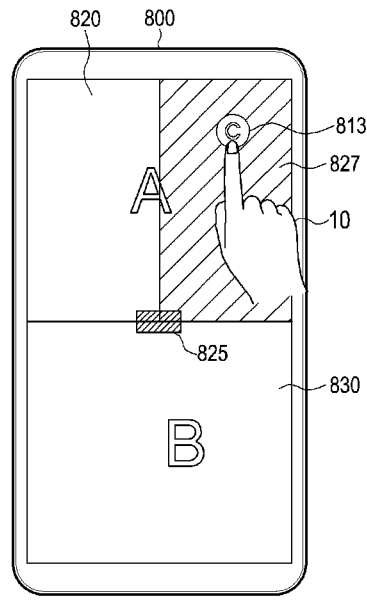

The user 10 may manipulate the display device 800 in order to run an additional third application C. For example, the user 10 may touch an icon 813 for the third application C as shown in FIG. 8H and drag the icon 813 to the right side of the first window 820 as shown in FIG. 8I. The controller controls the icon 813 to be displayed on the point where the user 10 touches. The controller may also control a ghost view 827 to be displayed around where the user 10 touches. As described above, since two windows, i.e., the windows 820 and 830 are displayed in the touch screen, the controller may control the ghost view 827 to be displayed in half a size and figure of the first window 820. Although not shown, if the user 10 touches somewhere in the left side of the first window 820, it will be obvious that the controller controls the ghost view to be displayed not in the right half but in the left half of the first window 820. The ghost view being displayed in the right half, as shown in FIG. 8I is by way of example only, but the controller may also divide the first window 820 into upper and lower halves and control the ghost view to be displayed in one of the upper and lower halves. The ghost view 827 controlled by the controller to be displayed in a half of the first window 820 is for illustrative purposes only. The controller may control the size and figure of the ghost view 827 to be set and displayed based on the center button 825. This will also be described with reference to FIGS. 8N, 8O, 8P, and 8Q.

Figure 8J:
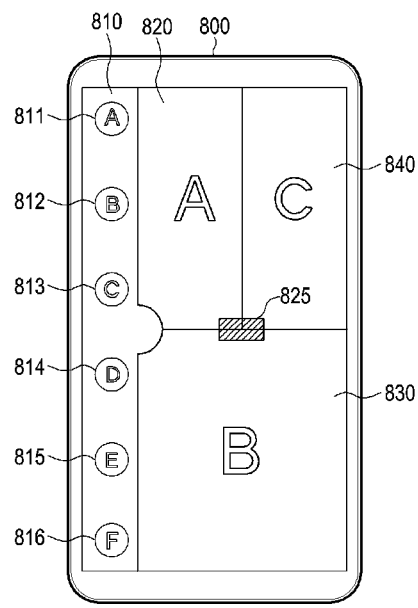

If the user's 10 drag gesture ends at somewhere in the right half of the first window 820 as shown in FIG. 8I, the controller determines that a new application run command to run a new application has been entered. As shown in FIG. 8J, the controller controls a third window 840 to be displayed in the right half of the first window 820 that corresponds to the ghost view 827 of FIG. 8I. The controller may also control the third window 840 to be displayed based on the center button 825.

As the third window 830 is generated, the controller controls the size and figure of the first window 820 to be reduced for display. More specifically, the controller may control the first window 820 to be displayed in the remaining area where the third window 840 is not displayed.

Figure 8K:
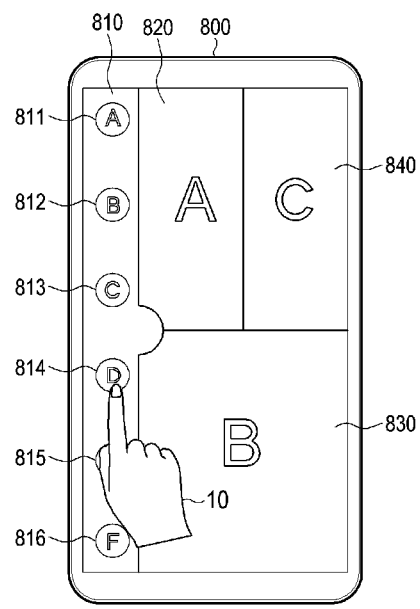
Figure 8L:
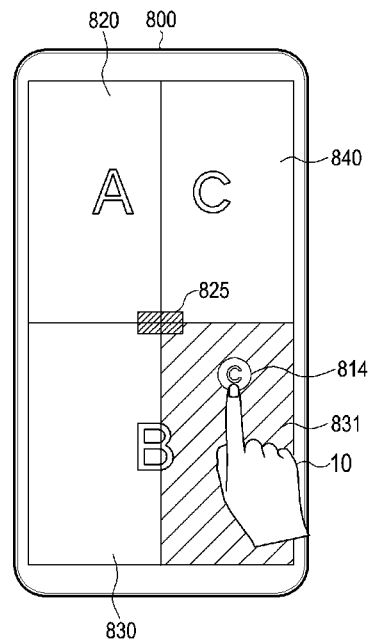

The user 10 may manipulate the display device 800 in order to run an additional fourth application D. For example, the user 10 may touch an icon 814 for the fourth application D as shown in FIG. 8K and drag the icon 814 to the right half of the second window 830 as shown in FIG. 8L. The controller controls the icon 814 to be displayed on the point where the user 10 touches. The controller may also control a ghost view 831 to be displayed around where the user 10 touches. As described above, since three windows, i.e., the windows 820, 830, and 840 are displayed in the touch screen, the controller may control the ghost view 831 to be displayed in half a size and figure of the second window 830. Although not shown, if the user 10 touches somewhere in the left half of the second window 830, it will be obvious that the controller controls the ghost view to be displayed not in the right half but in the left half of the second window 830. The ghost view being displayed in the right half, as shown in FIG. 8L is by way of example only, but the controller may also divide the second window 830 into upper and lower halves and control the ghost view to be displayed in one of the upper and lower halves. The ghost view 831 controlled by the controller to be displayed in a half of the second window 830 is for illustrative purposes only. The controller may control the size and figure of the ghost view 831 to be set and displayed based on the center button 825. This will also be described with reference to FIGS. 8N, 8O, 8P, and 8Q.

Figure 8M:
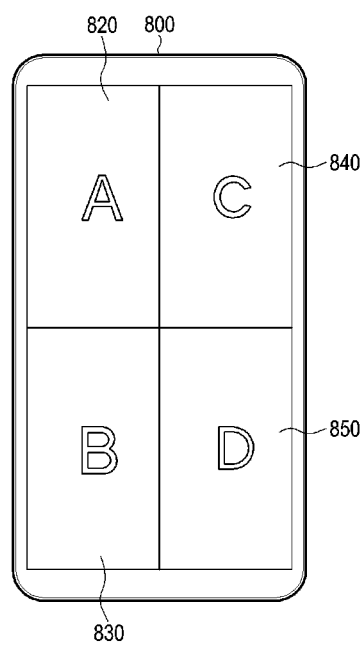

If the user's 10 drag gesture ends at somewhere in the right half of the second window 830 as shown in FIG. 8L, the controller determines that a new application run command to run a new application has been entered. As shown in FIG. 8M, the controller controls a fourth window 850 to be displayed in the right half of the second window 830 that corresponds to the ghost view 831 of FIG. 8L. Alternatively, the controller may also control the fourth window 850 to be displayed to the position of the center button 825.

As the fourth window 850 is created, the controller controls the size and figure of the second window 830 to be reduced for display.

FIGS. 8N, 8O, 8P, and 8Q illustrate how to divide a screen according to embodiments of the present disclosure.

Figure 8N:
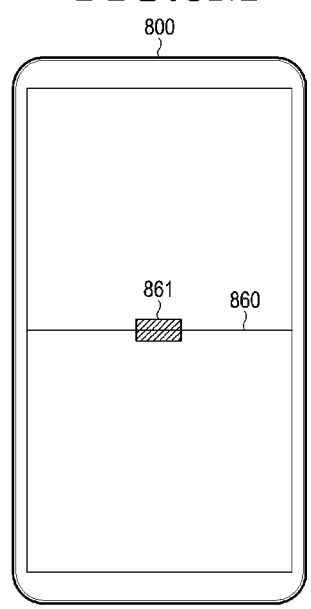
FIGS. 8N, 8O, 8P, and 8Q illustrate how to divide a screen according to embodiments of the present disclosure.
Figure 8O:
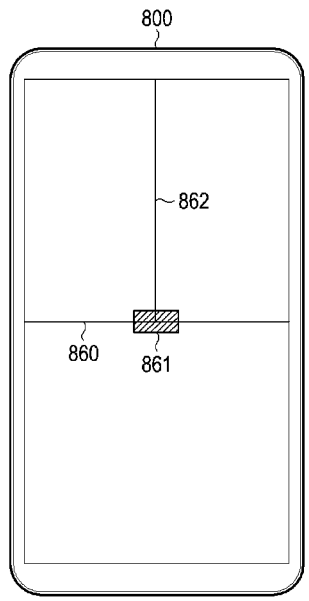

Referring to FIGS. 8N and 8O, with a center button 861 placed in the center of the touch screen, the controller establishes a border line 860 based on the center button 861. When a new application run command is entered, as shown in FIG. 8I, the controller establishes a border line 862 based on the center button 861. The controller may control a new window to be placed and displayed in a window display space formed by the border lines 860 and 862.

Figure 8P:
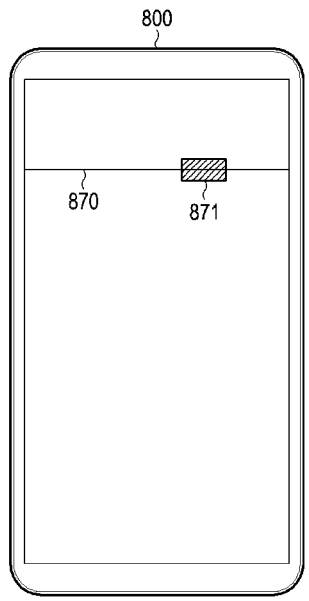
Figure 8Q:
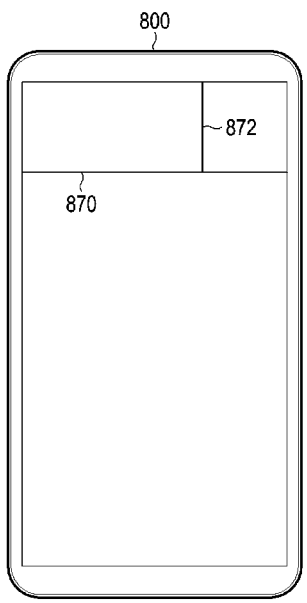

Referring to FIGS. 8P and 8Q, with a center button 871 placed somewhere other than the center of the touch screen, the controller establishes a border line 870 based on the center button 871. As the center button 871 is moved, the size and figure of a displayed window may be changed, which will be described with reference to FIGS. 18A, 18B, 18C, 18D, 18E, 18F, and 18G. When a new application run command is entered, as shown in FIG. 8I, the controller establishes a border line 872 based on the center button 871. The controller may control a new window to be placed and displayed in a window display space formed by the border lines 870 and 872. In contrast to the embodiment of FIG. 8O, in this embodiment, the window display space in which the new window is to be placed may be formed to be small in size.

Figure 8R:
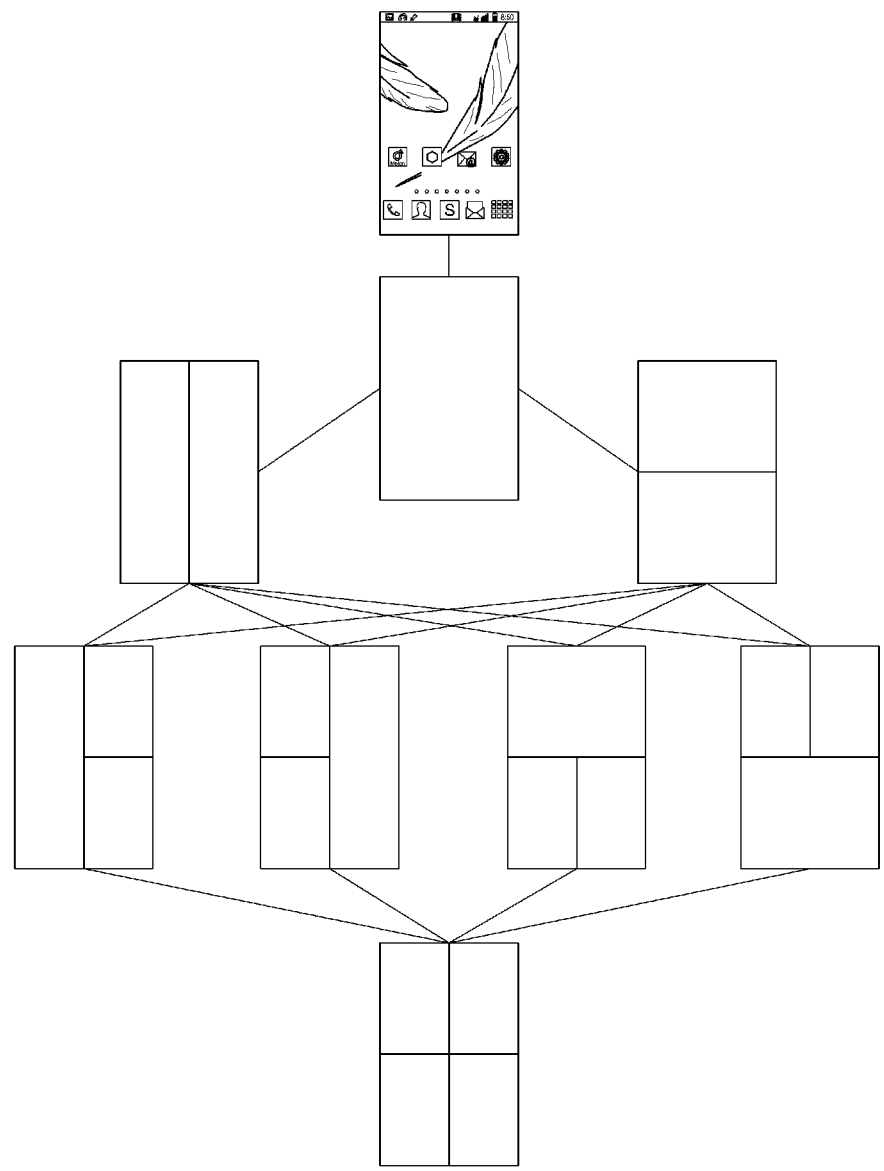
FIG. 8R illustrates an establishment of various window display spaces according to an embodiment of the present disclosure.

FIG. 8R illustrates an establishment of various window display spaces according to an embodiment of the present disclosure.

Referring to FIG. 8R, the display device may establish various window display spaces by dividing the screen into e.g., left and right halves, upper and lower halves, three parts, four parts, and the like.

Figure 8S:
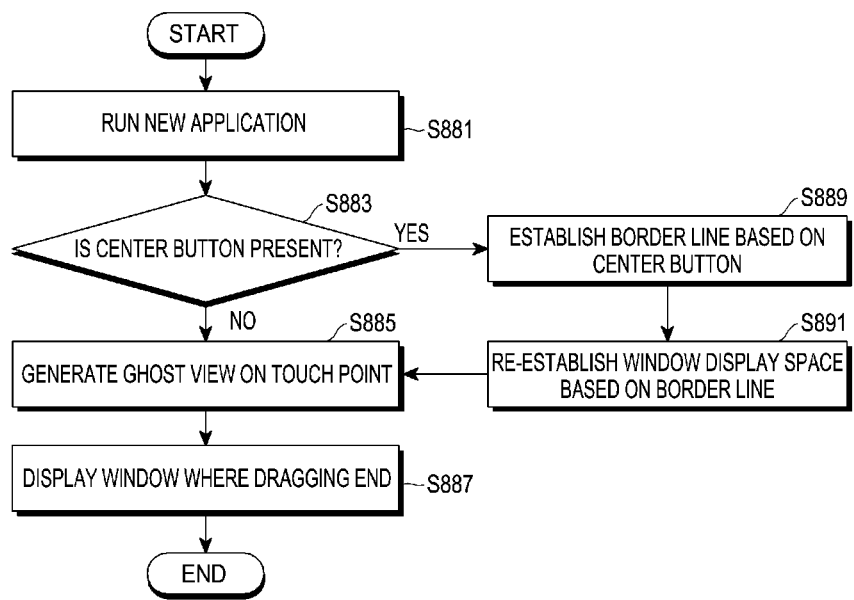
FIG. 8S is a flowchart illustrating a method for controlling a display device according to an embodiment of the present disclosure.

FIG. 8S is a flowchart illustrating a method for controlling a display device according to an embodiment of the present disclosure.

Referring to FIG. 8S, the display device may receive a new application run command to launch a new application, in operation S881. The new application run command may be e.g., a drag gesture that drags an icon for the new application and drops the icon at a desired location around which to run the new application.

The display device may determine whether a center button to control window display is displayed in the touch screen, in operation S883. If the center button is not displayed in operation S883, the display device may generate and display a ghost view around the point on which the user touches, in operation S885. The ghost view may have a default size and figure. As an example, if there is no window displayed, the display device may generate and display the ghost view in full screen. As another example, if there is one window displayed in full screen, the display device may display the ghost view to have a size and figure equal to an half of the touch screen in the half of the touch screen that contains the touch point.

The display device displays a new window around where the drag gesture ends, in operation S887. The new window may have the same size and figure as the displayed ghost view.

On the other hand, if the center button is displayed in operation 883, the display device may establish a border line based on the center button, in operation S889. The display device may or may not display the border line. For example, the display device may not display the border line until the new window is displayed. After the new window is displayed, the display device may display the border line, as shown in FIG. 8J. What was described above is for illustrative purposes only, and the display device may display the border line based on the center button even before the new window is displayed.

The display device may re-establish the window display space based on the border line, in operation S891, and may generate and display a ghost view to correspond to the re-established window display space, in operation S885.

Figure 9A:
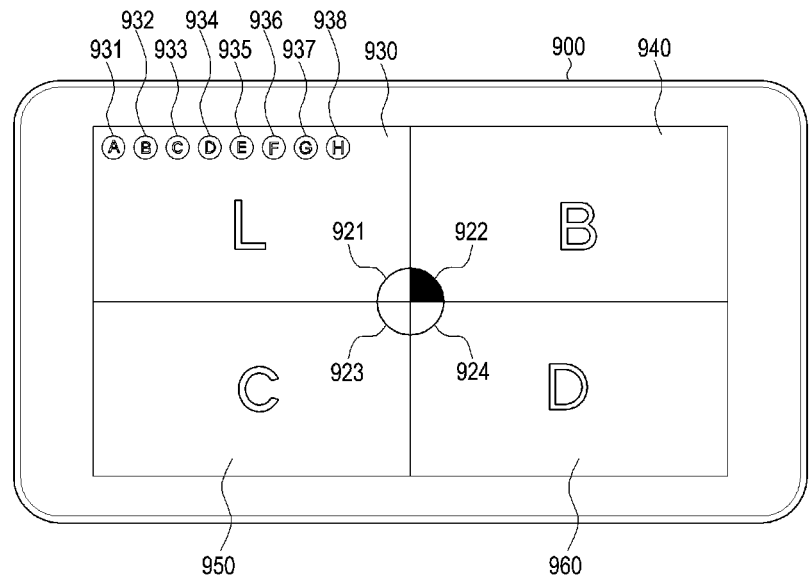
FIGS. 9A, 9B, and 9C illustrate a display device according to embodiments of the present disclosure.
Figure 9B:
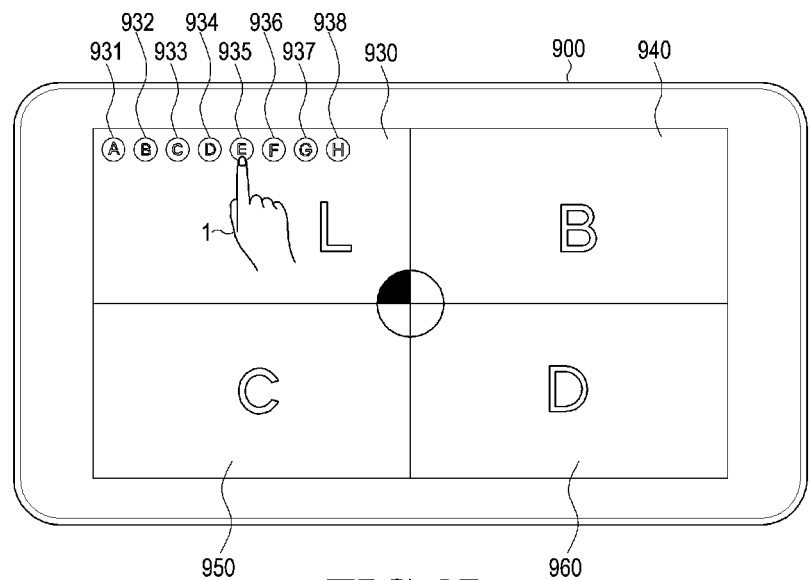
Figure 9C:
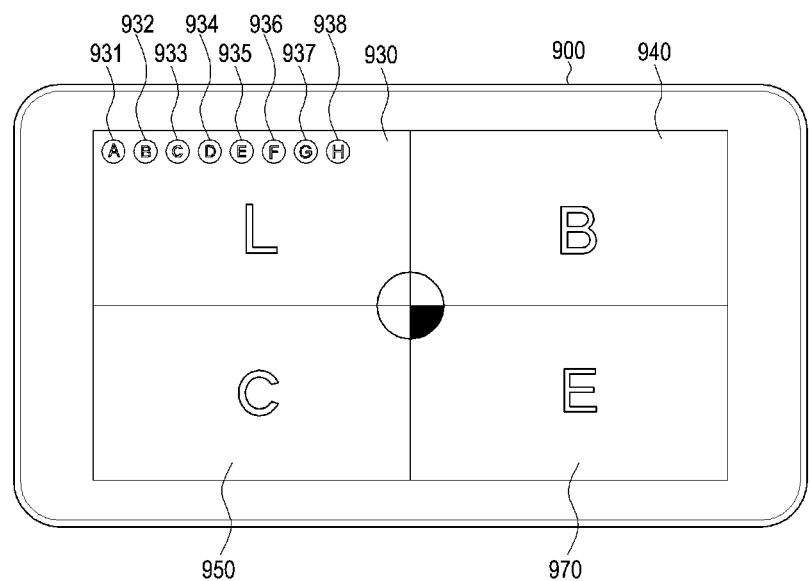

FIGS. 9A, 9B, and 9C illustrate a display device according to embodiments of the present disclosure. FIGS. 10A, 10B, and 10C illustrate activity stacks according to embodiments of the present disclosure.

Referring to FIG. 9A, a display device 900 may display windows 930, 940, 950, and 960 in display sections, respectively. The controller controls the window for running a launcher application to be displayed in the first section. The launcher application provides application icons 931 to 938 to run respective applications. The display device 900 is substantially the same as that of FIG. 2H. However, in contrast to the display device of FIG. 2H, the display device of FIG. 9A may further display highest stack level indicators 921 to 924 in the center of the touch screen. The embodiment of FIG. 9A will be described in conjunction with FIG. 10A that illustrates an activity stack. In the activity stack of FIG. 10A, it is seen that a B application stack 1002 is at the highest activity stack level followed by an L application stack 1001, a C application stack 1003, and a D application stack 1004. Thus, the controller may control the highest stack level indicator 922 located in the second section to be displayed in a different color or different brightness, as shown in FIG. 9A. The user may know that the application B has the highest activity stack level.

Referring to FIGS. 9B and 9C, the user 1 may touch an icon 935 for application E. In this regard, a reference to an activity stack of FIG. 10B will be made. Since the user 1 inputted an application run command in the launcher application by touching the icon 935, a launcher application stack 1001 comes on top of a D application stack 1004 in the activity stack, which means that the launcher application have a higher activity stack level than the activity stack level of the application D 1001. The controller may control the highest stack level indicator 921 to be displayed in a different color or different brightness.

When the icon 935 for application E is touched, the controller controls a fifth window 970 for running the application E to be displayed in the fourth section, as shown in FIG. 9C.

Referring to FIGS. 10A, 10B, and 10C, in this regard, a reference to an activity stack of FIG. 10C will be made. As the application E runs, the controller generates an E application stack 1005 in the activity stack. In this regard, the controller puts the latest E application stack 1005 on top of the launcher application stack 1001. This means that the application E's activity stack level is higher than the launcher application's activity stack level. Thus, the controller may control the highest stack level indicator 924 located in the fourth section to be displayed in a different color or different brightness, as shown in FIG. 9C.

Figure 11:
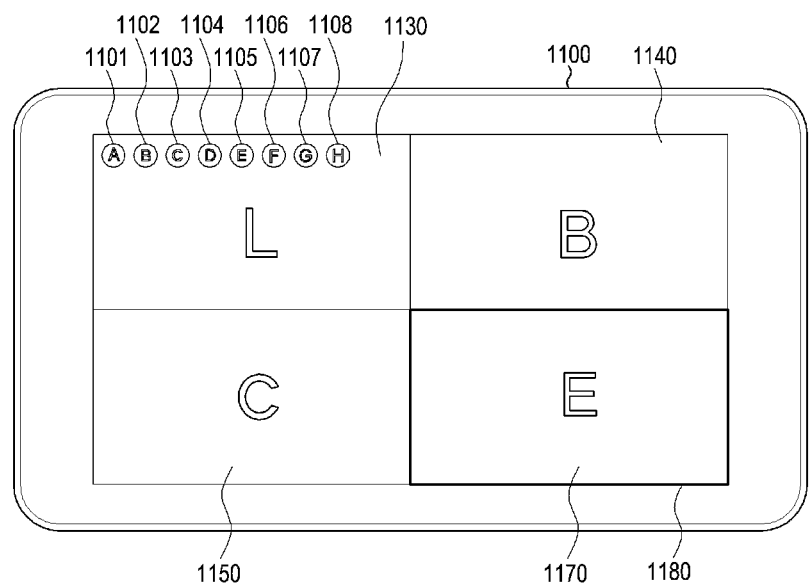
FIG. 11 illustrates a display device according to an embodiment of the present disclosure.

FIG. 11 illustrates a display device according to an embodiment of the present disclosure.

Referring to FIG. 11, a display device 1100 may display windows 1130, 1140, 1150, and 1170 in the display sections, respectively. The controller controls the window for running a launcher application to be displayed in the first section. The launcher application provides application icons 1101 to 1108 to run respective applications. The controller may control the window 1170 that has the highest activity stack level to be displayed with an outline 1180 in a different color or different brightness.

FIGS. 12A, 12B, 12C, 12D, 12E, 12F, 12G, and 12H illustrate a display device according to embodiments of the present disclosure.

Figure 12A:
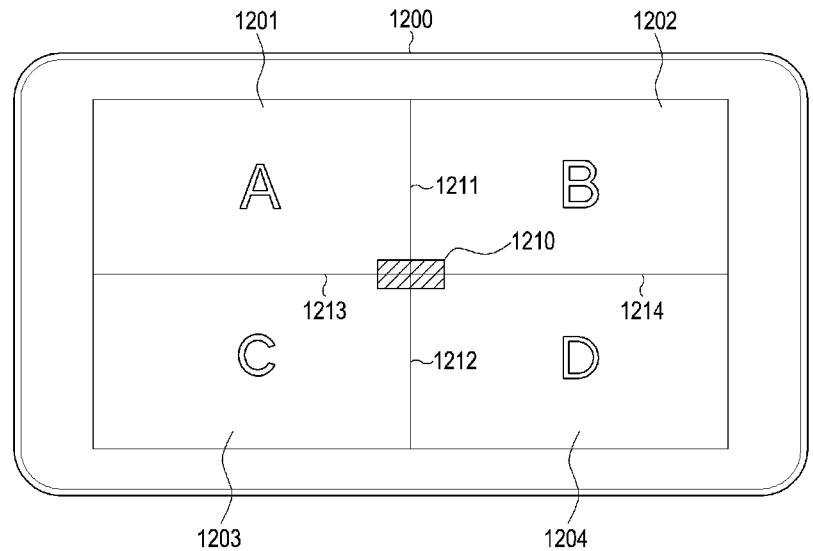
FIGS. 12A, 12B, 12C, 12D, 12E, 12F, 12G, and 12H illustrate a display device according to embodiments of the present disclosure.

Referring to FIG. 12A, a display device 1200 may establish a plurality of window display spaces on the touch screen. More specifically, the controller may establish first to fourth sections. The controller may also set up a first border line 1211 between the first section and the second section, a second border line 1212 between the third section and the fourth section, a third border line 1213 between the first section and the third section, and a fourth border line 1214 between the second section and the fourth section. The controller may also control a center button 1210 to be displayed at the intersection of the first to fourth border lines 1211 to 1214.

The controller controls a respective window for running an application to be placed and displayed in each of the sections. For example, the controller controls a first window 1201 for running an application A to be displayed in the first section, a second window 1202 for running an application B to be displayed in the second section, a third window 1203 for running an application C to be displayed in the third section, and a fourth window 1204 for running an application D to be displayed in the fourth section.

Figure 12B:
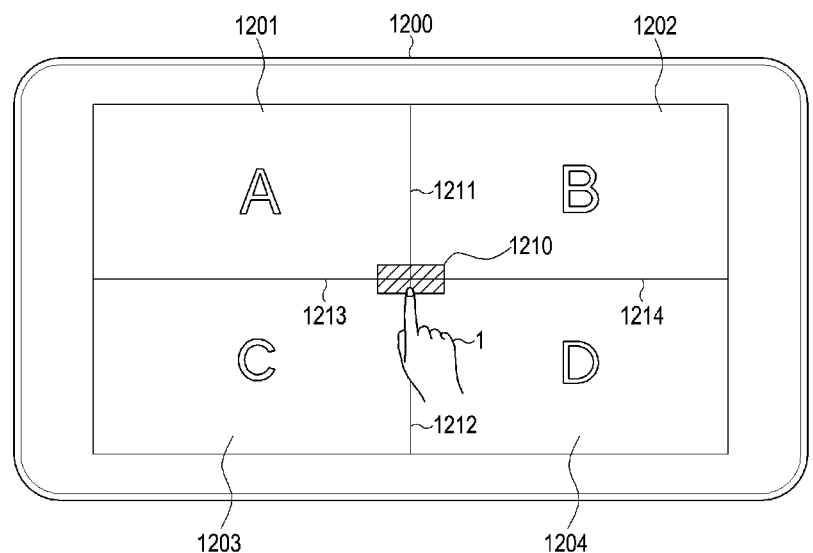
Figure 12C:
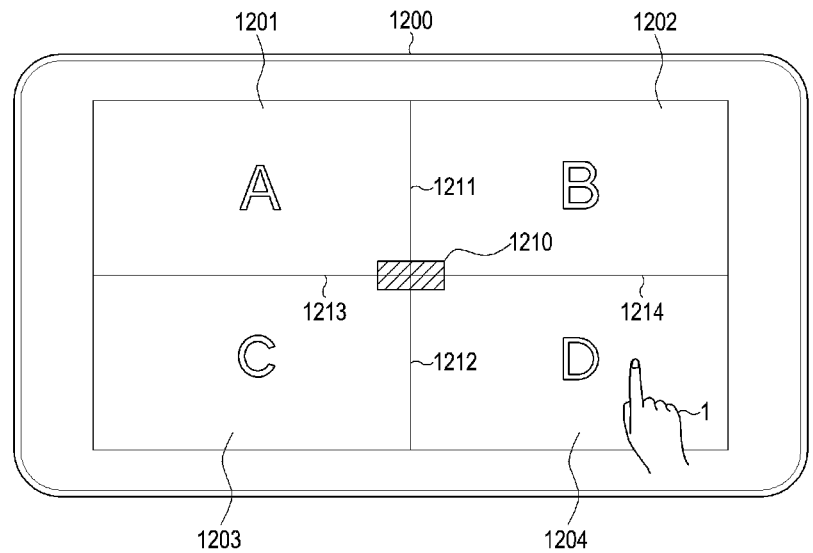
Figure 12D:
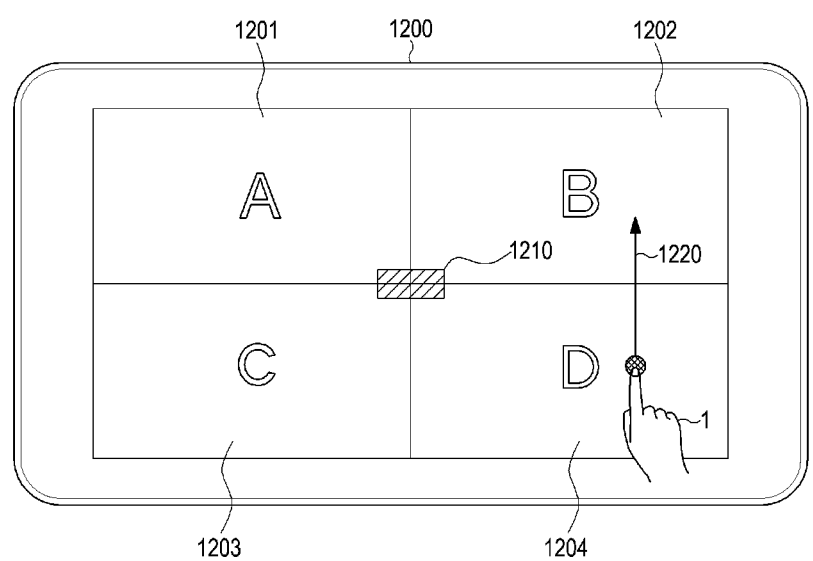
Figure 12E:
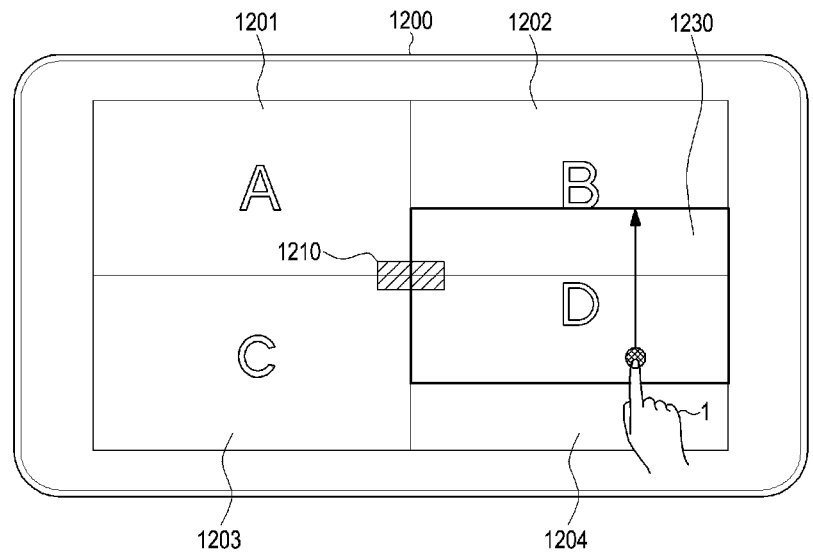

Referring to FIG. 12B, the user 1 may implement a long press on a center button 1210. The long press on the center button 1210 is an example of executing a window-position change mode. In response to the long press on the center button 1210, the controller may enter the window-position change mode. Even if the user 1 releases the long-press, the controller may maintain the window-position change mode. In the window-position change mode, the controller may not handle any gesture being made on a window. For example, the controller controls a dummy view to be generated and displayed in the window and controls the gesture being made on the window to be dispatched to the dummy view. By doing this, the controller may prevent an application running in the window from being manipulated while in the window-position change mode.

Referring to FIGS. 12C, 12D, 12E, 12F, 12G, and 12H, the user 1 may touch the fourth window 1204 for position change. And the user 1 may make an upward drag gesture 1220 toward the second window 1202 from the fourth window 1204 as a window-position change command. A window-position change command may be a drag gesture that drags a target window to be moved to a final window display space. Referring back to FIG. 12C, the window-position change command may be interpreted as a command to move the position of the fourth window 1204 to the position of the second window 1202.

Figure 12F:
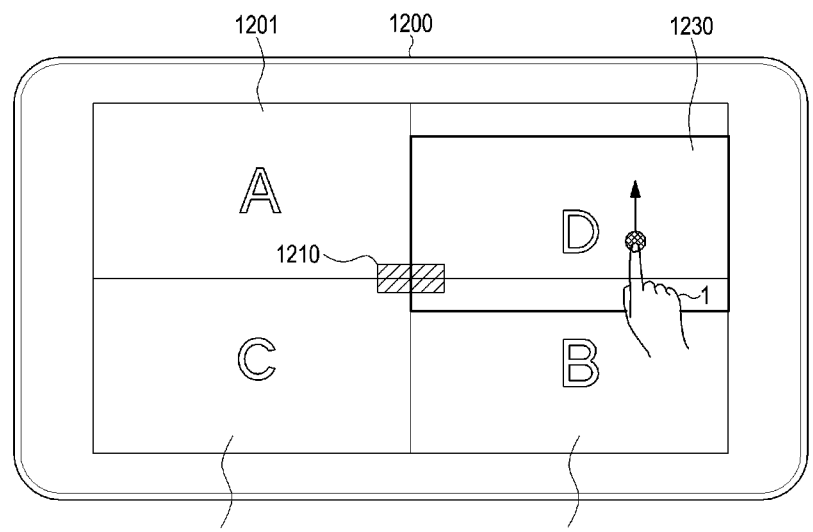

The controller may control a ghost view 1230 of the fourth window 1204 to be displayed in response to the drag gesture 1220. The ghost view 1230 may be displayed in the same size and figure as that of the fourth window 1204 but in a different color or different brightness. The controller may move the position of the ghost view 1230 along with the drag gesture 1220, as shown in FIG. 12F.

Figure 12G:
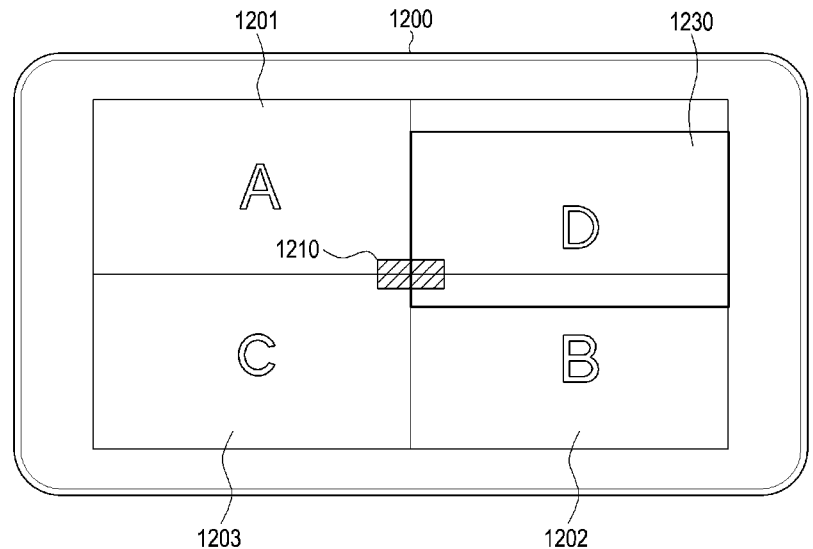
Figure 12H:
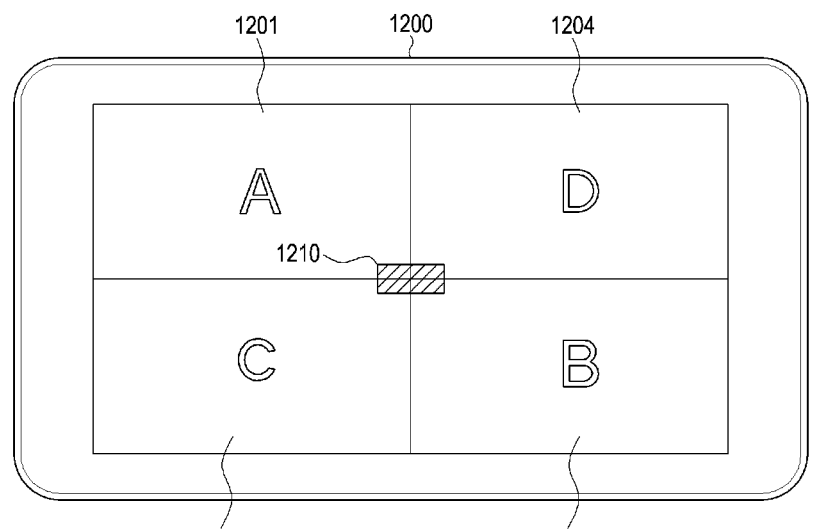

The user 1 may stop making the drag gesture 1220, as shown in FIG. 12G. The controller determines that the drag gesture 1220 ended within the second section in which the application B is running. The controller controls the second window 1202 placed in the second section to be swapped with the fourth window 1204. Specifically, the controller controls the fourth window 1204 to be displayed in the second section and the second window 1202 to be displayed in the fourth section, as shown in FIG. 12H.

According to what were described above, the user may easily change window positions of running applications that are displayed in their respective window display spaces.

Figure 13:
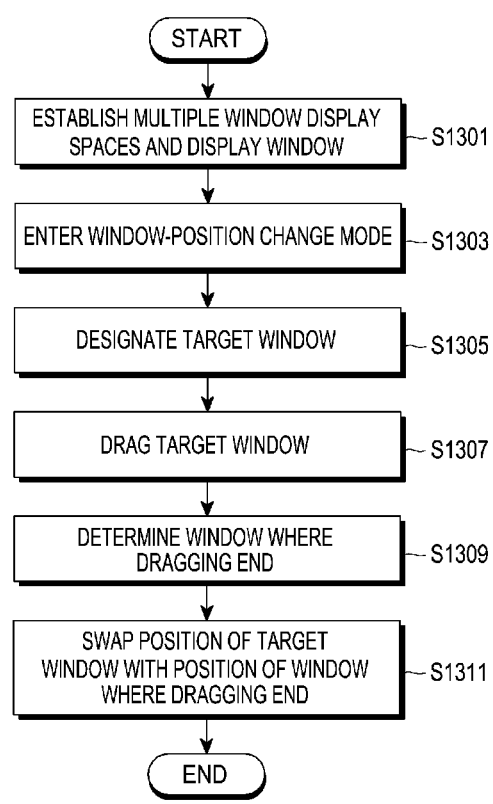
FIG. 13 is a flowchart illustrating a method for controlling a display device according to an embodiment of the present disclosure.

FIG. 13 is a flowchart illustrating a method for controlling a display device according to an embodiment of the present disclosure.

Referring to FIG. 13, the display device may establish a plurality of window display spaces on the touch screen, in operation S1301. In the embodiment, there are four window display spaces established, which is by way of example only. The display device may place and display a respective window for running an application in each of the plurality of window display spaces.

The display device may start a window-position change mode, in operation S1303. For example, the display device may start the window-position change mode when a long press gesture is made on the center button. In the window-position change mode, the display device may receive a window-position change command.

For example, the display device may receive the window-position change command that starts with designation of a target window whose position is to be changed in operation S1305, and receive a drag gesture that starts from the target window in operation S1307. The display device may identify a window where the drag gesture ended in operation S1309, and swap positions of the target window and the window where the drag gesture ended with each other in operation S1311.

FIGS. 14A, 14B, 14C, 14D, 14E, and 14F illustrate a display device according to embodiments of the present disclosure.

Figure 14A:
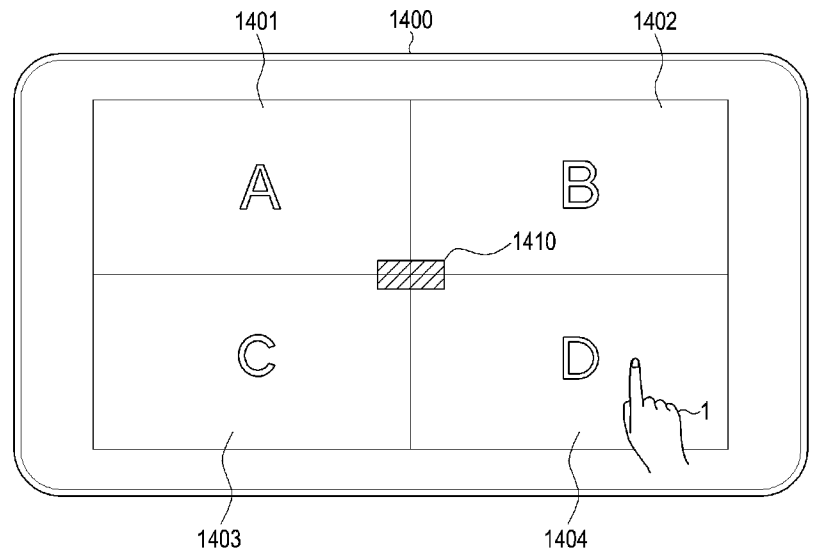
FIGS. 14A, 14B, 14C, 14D, 14E, and 14F illustrate a display device according to embodiments of the present disclosure.

Referring to FIG. 14A, a display device 1400 may establish a plurality of window display spaces on the touch screen. More specifically, the controller may establish first to fourth sections. The controller controls a respective window for running an application to be placed and displayed in each of the sections. For example, the controller controls a first window 1401 for running an application A to be displayed in the first section, a second window 1402 for running an application B to be displayed in the second section, a third window 1403 for running an application C to be displayed in the third section, and a fourth window 1404 for running an application D to be displayed in the fourth section. The controller may also control a center button 1410 to be displayed at the center of the display device 1400. Referring to FIG. 14A, it is assumed that the display device has entered the window-position change mode. The user 1 may designate the fourth window 1404 as a target window whose position is to be changed.

Figure 14B:
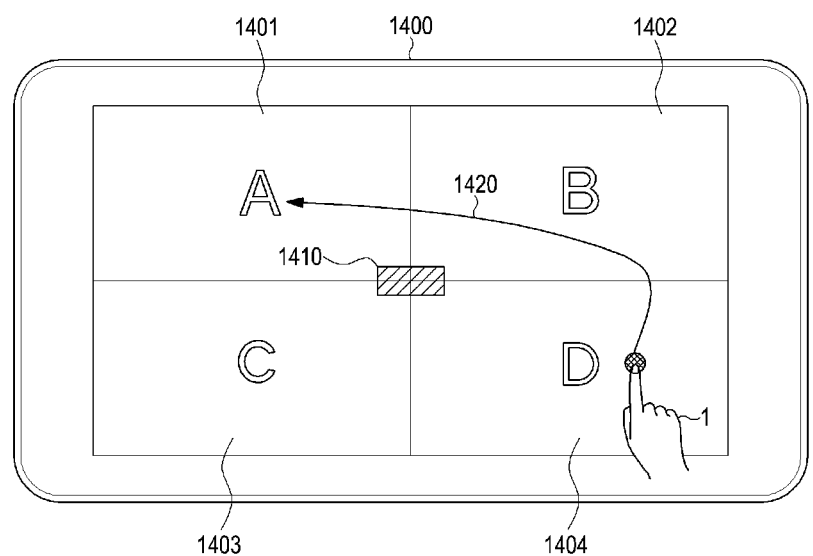
Figure 14C:
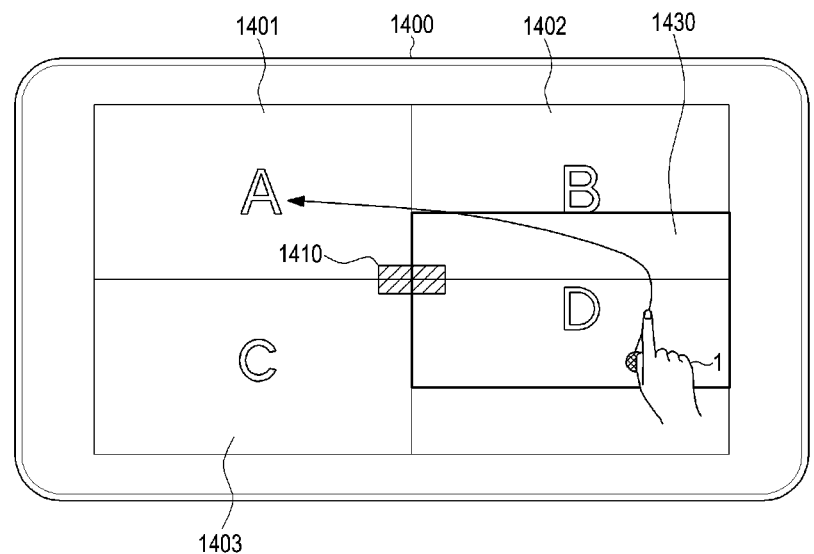
Figure 14D:
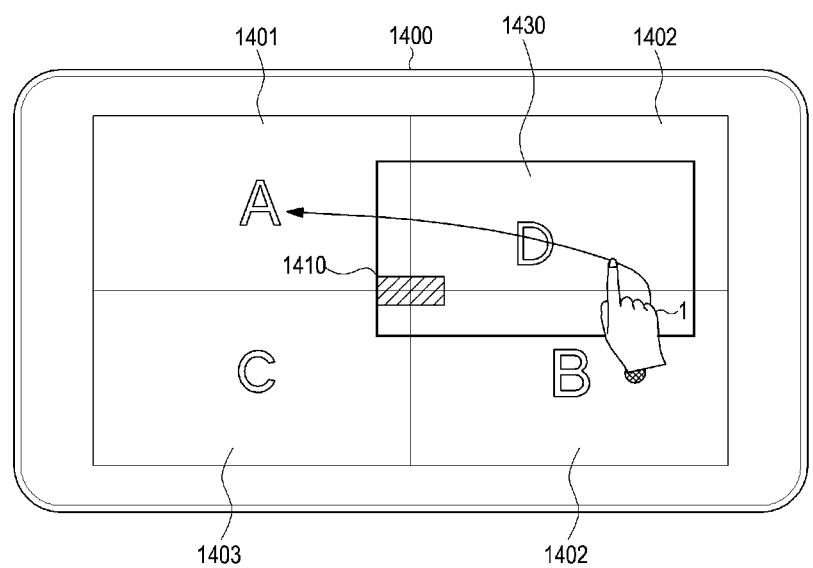
Figure 14E:
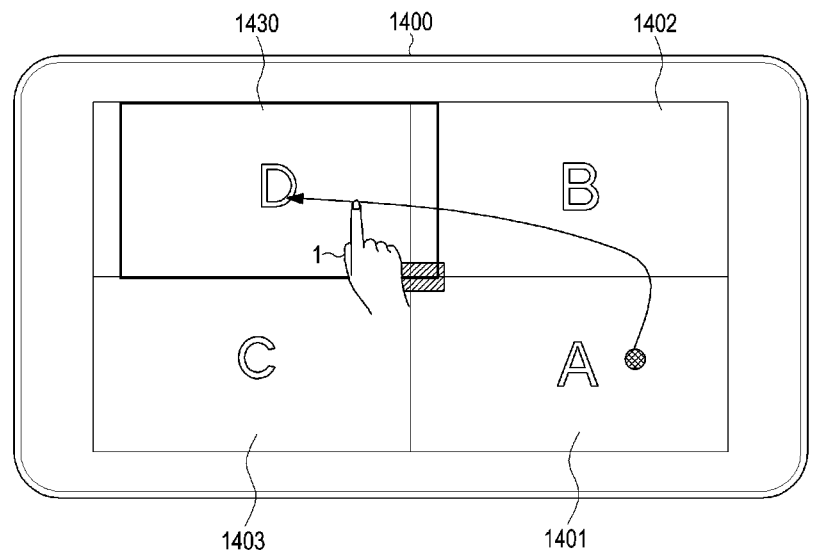

Referring to FIG. 14B, the user 1 may make a drag gesture starting from the target window 1404. The controller may display a ghost view 1430 around touch points of the drag gesture 1420, as shown in FIGS. 14C, 14D, and 14E. The user 1 may stop making the drag gesture 1420 within the first section, as shown in FIG. 14E. If a touch point of the drag gesture 1420 is in the second section as shown in FIG. 14D, the controller may control the second window 1402 that has been placed and displayed in the second section to be displayed in the fourth section to make room for the ghost view 1430. Furthermore, if a touch point of the drag gesture 1420 is in the first section as shown in FIG. 14E, the controller may control the first window 1401 that has been placed and displayed in the first section to be displayed in the fourth section to make room for the ghost view 1430. In this case, the controller controls the second window 1402 displayed in the fourth section to be displayed back in the second section.

Figure 14F:
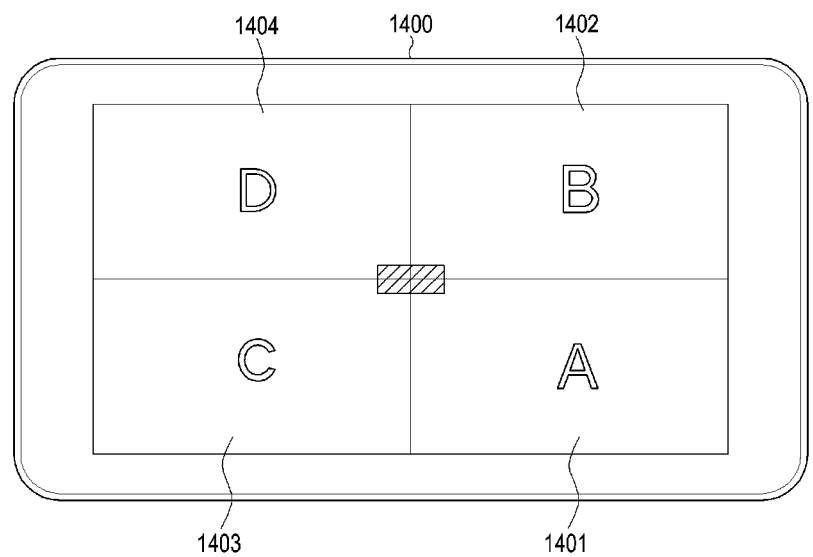

Referring to FIG. 14F, the controller may determine that the drag gesture 1420 ended in the first section. The controller controls the first window 1401 that has been placed in the first section to be swapped with the fourth window 1404 of the fourth section.

Figure 15:
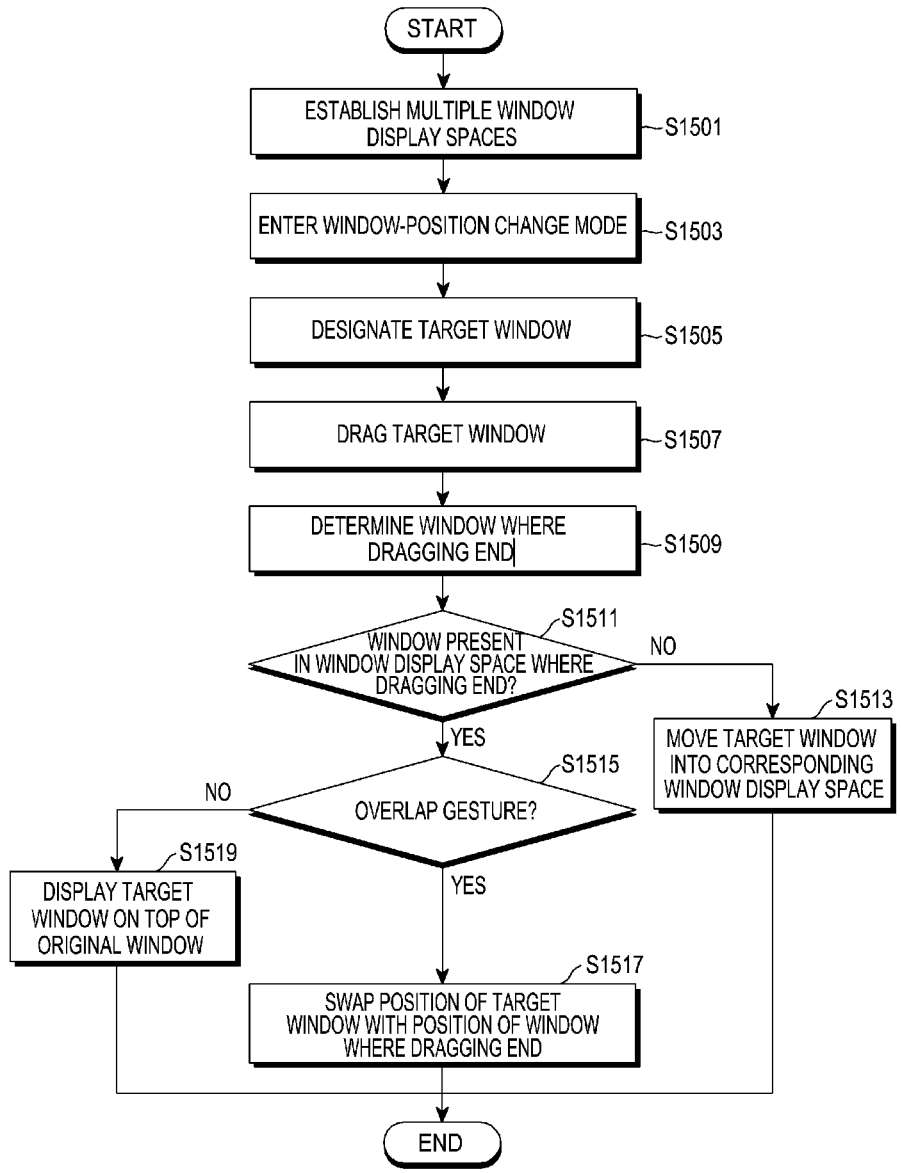
FIG. 15 is a flowchart illustrating a method for controlling a display device according to an embodiment of the present disclosure.

FIG. 15 is a flowchart illustrating a method for controlling a display device according to an embodiment of the present disclosure.

Referring to FIG. 15, operations S1501 to S1509 of FIG. 15 are the same as operations S1301 to S1309 of FIG. 13, description of which will be omitted.

The display device may determine whether there is any window being displayed in the window display space in which a drag gesture ended, in operation S1511. If there is no window displayed in the window display space in which the drag gesture ended in operation S1511, the display device moves and displays a target window whose position is to be changed to the window display space in which the drag gesture ended, in operation S1513. This will be described in connection with FIGS. 16A to 16E.

On the other hand, if there is a window displayed in the window display space in which the drag gesture ended in operation S1511, the display device may determine whether a window overlap gesture is made in operation S1515. If the window overlap gesture is made in operation S1515, the display device displays the target window by overlapping the target window on an original window that has been displayed in the window display space, in operation S1519. In other words, the display device displays the target window in the window display space without displaying the original window that has been displayed in the window display space. This will be described in connection with FIGS. 17A, 17B, 17C, 17D, 17E, 17F, and 17G.

If the window overlap gesture is not made in operation S1515, the display device swaps positions of the original window and the target window with each other and displays the result, in operation S1517.

Figure 16A:
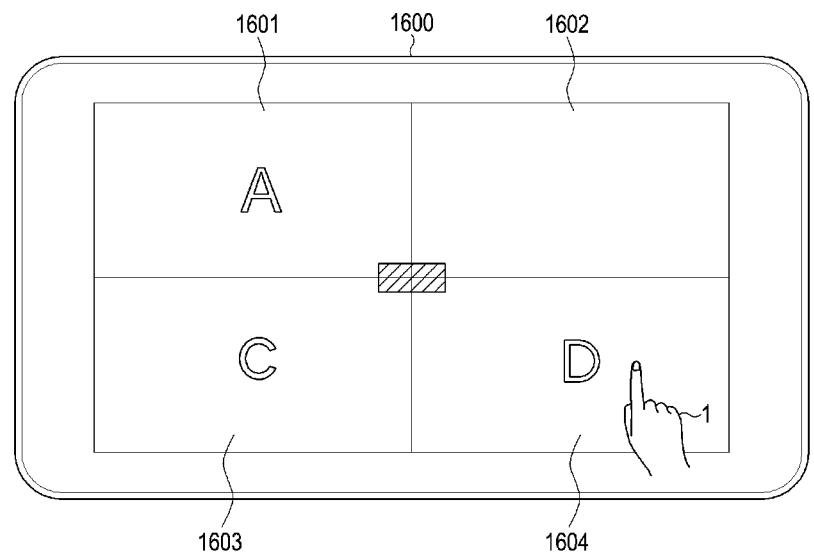
FIGS. 16A, 16B, 16C, 16D, and 16E illustrate a display device according to embodiments of the present disclosure.
Figure 16B:
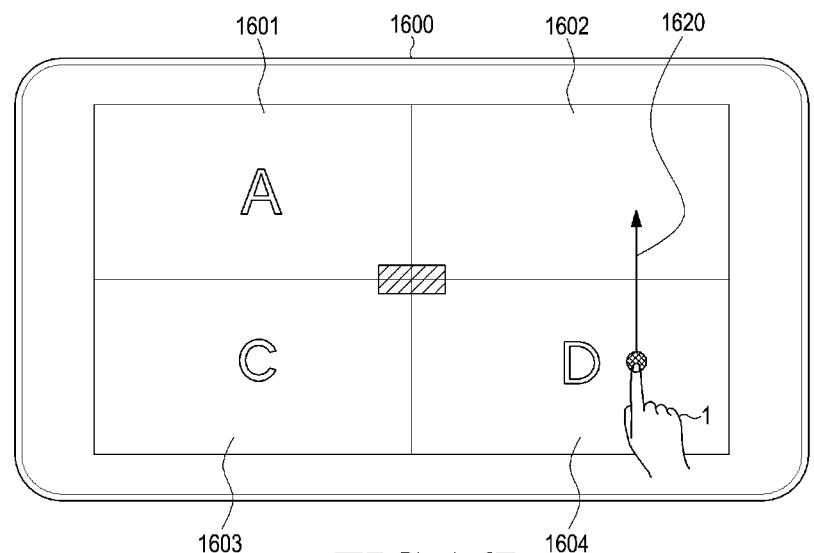

FIGS. 16A, 16B, 16C, 16D, and 16E illustrate a display device according to embodiments of the present disclosure. Referring to FIG. 16A, a display device 1600 displays a first window 1601, a third window 1603, and a fourth window 1604 in the first section, the third section, and the fourth section, respectively, without displaying a second window in the second section 1602. It is assumed herein that the display device has entered the window-position change mode. The user 1 may designate the fourth window 1604 as a target window whose position is to be changed.

Figure 16C:
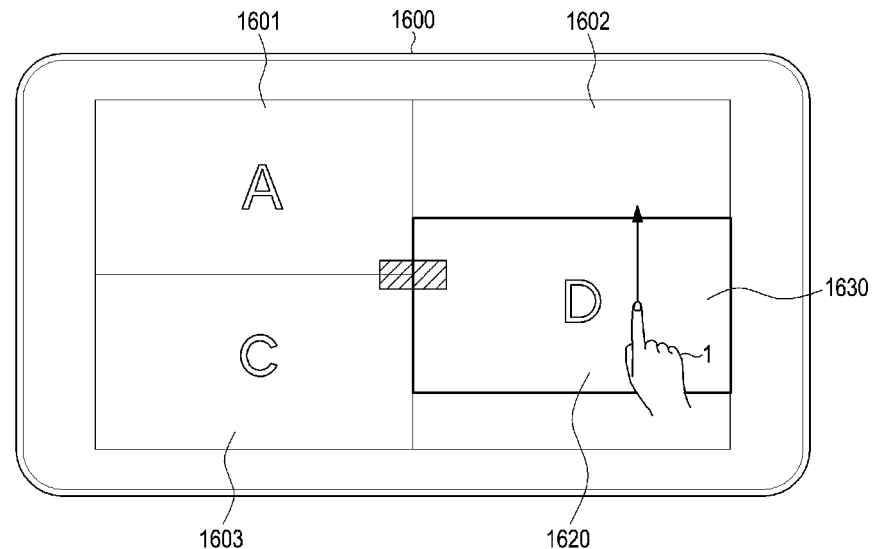
Figure 16D:
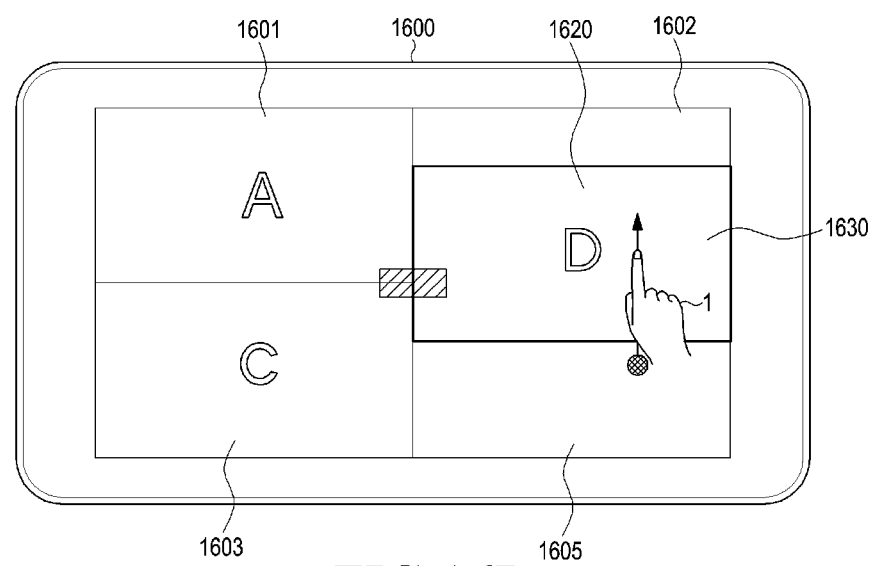
Figure 16E:
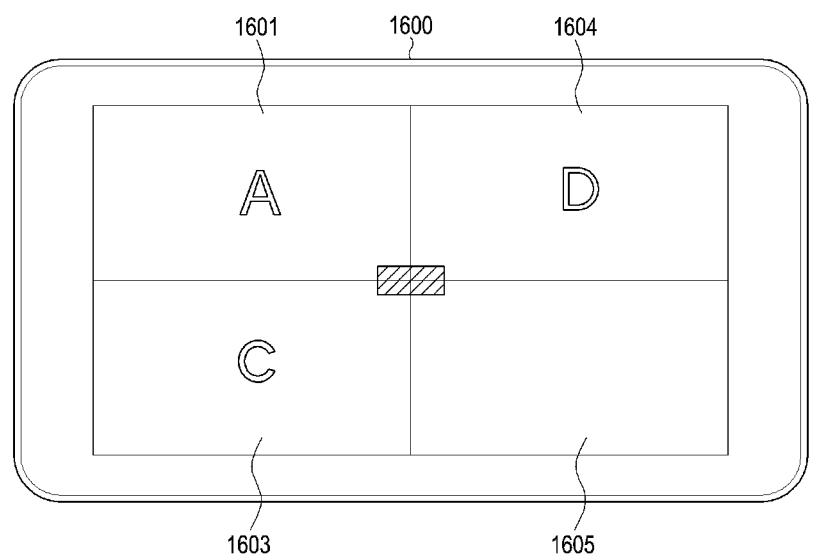

Referring to FIGS. 16B, 16C, 16D, and 16E, the user 1 may make a drag gesture 1620 to change the position of the fourth window 1604 into the second section 1602. In response, the controller may control a ghost view 1630 to be displayed around touch points of the drag gesture 1620, as shown in FIGS. 16C and 16D. The controller may determine that a window display space where the drag gesture 1620 ended is the second section 1602. The controller may determine that there is no window displayed in the second section 1602. The controller controls the fourth window 1604 to be displayed in the second section 1602 while controlling the fourth section 1605 to remain as an empty space.

FIGS. 17A, 17B, 17C, 17D, 17E, 17F, and 17G illustrate a display device according to embodiments of the present disclosure.

Figure 17A:
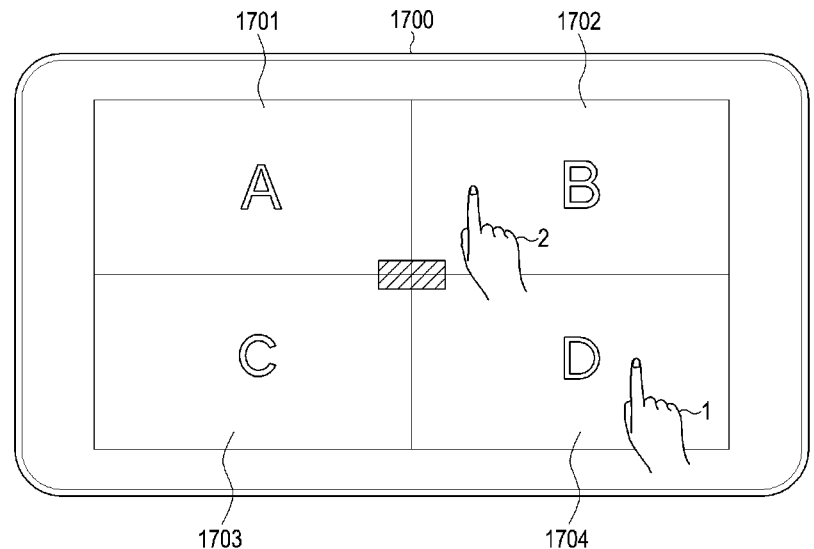
FIGS. 17A, 17B, 17C, 17D, 17E, 17F, and 17G illustrate a display device according to embodiments of the present disclosure.
Figure 17B:
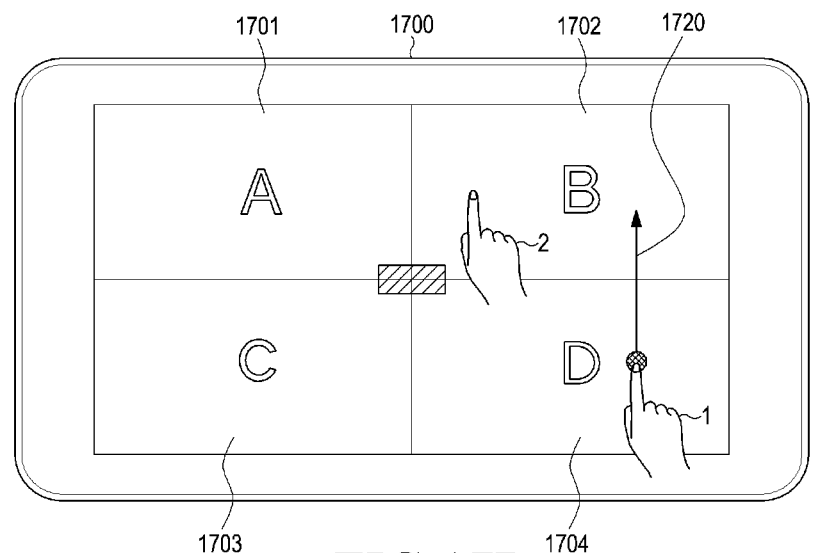
Figure 17C:
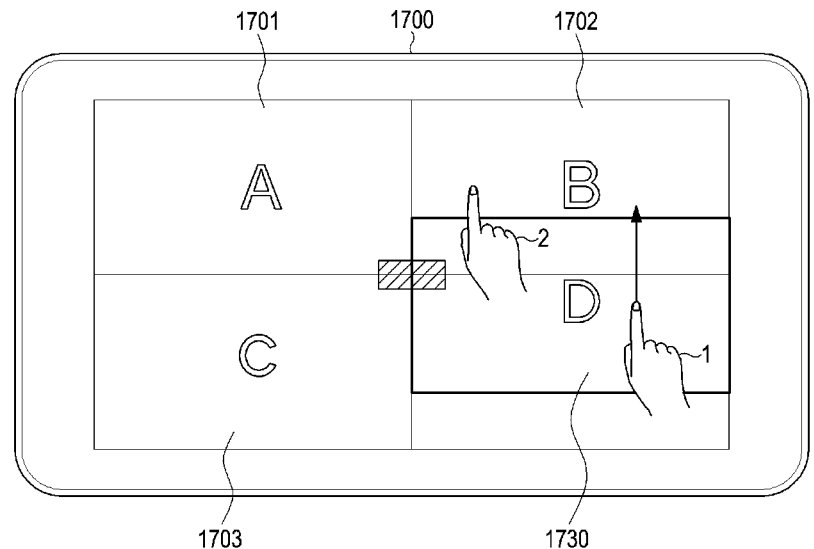
Figure 17D:
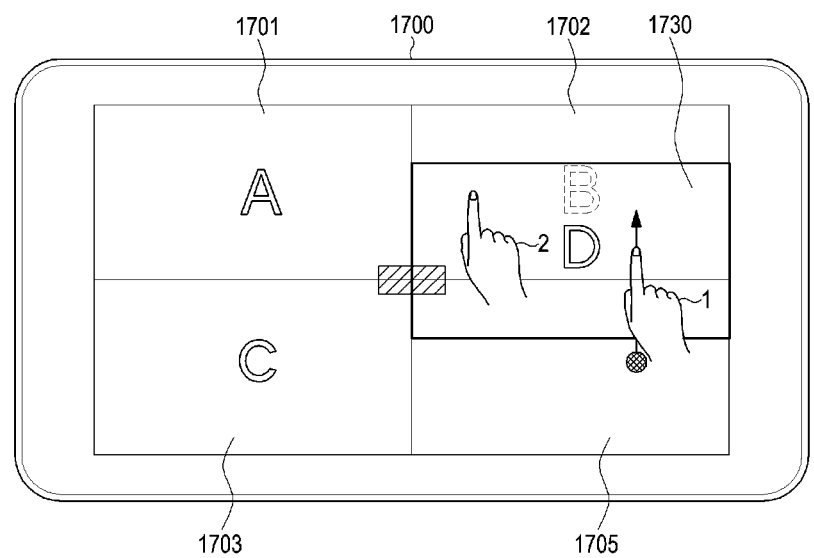
Figure 17E:
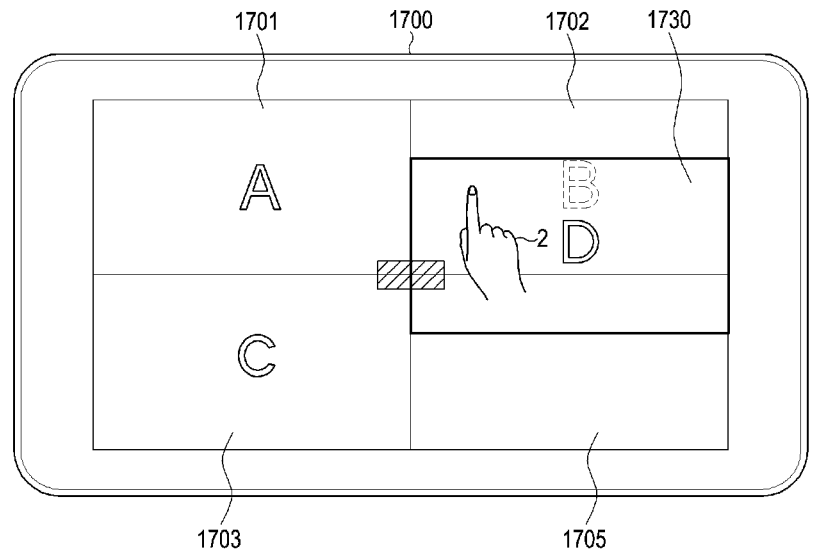

Referring to FIG. 17A, a display device 1700 displays a first window 1701, a second window 1702, a third window 1703, and a fourth window 1704 in the first section, the second section, the third section, and the fourth section, respectively. It is assumed herein that the display device has entered the window-position change mode. The user 1 may designate the fourth window 1704 as a target window whose position is to be changed. The user 1 may also input a window overlap command by touching the second window 1702 with another finger 2.

Referring to FIGS. 17B, 17C, 17D, 17E, 17F, and 17G, the user 1 may make a drag gesture 1720 to change the position of the fourth window 1704 into the second section. In response, the controller may control a ghost view 1730 to be displayed around touch points of the drag gesture 1720, as shown in FIGS. 17C to 17F. In this case, the controller may control the position of the second window 1702 to be fixed based on the window overlap command.

The controller may determine that a window display space where the drag gesture 1720 ended is the second section. The controller may determine that the second window 1702 is being displayed in the second section. The controller controls the fourth window 1704 to be displayed on top of the second window 1702 according to the window overlap command input to the second window 1702. In other words, the controller controls the fourth window 1704 to be displayed in the second section while preventing the second window 1702 from being displayed. The controller may also manage an activity stack in order for the fourth window 1704 to be on top of the second window 1702 in the activity stack.

Figure 17F:
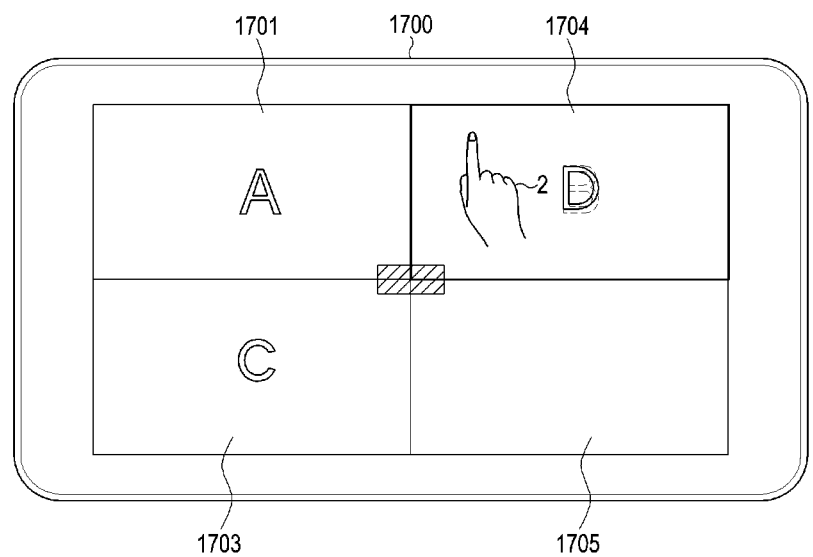
Figure 17G:
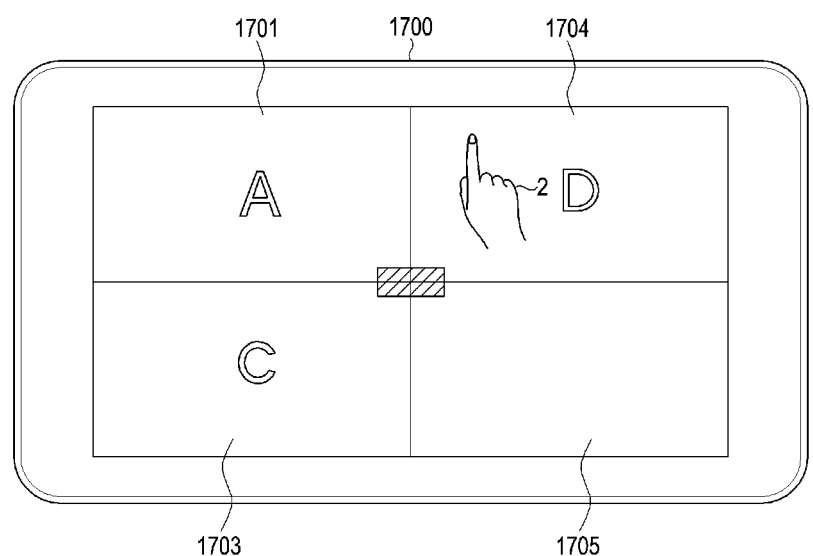

The controller may control the fourth window 1704 to be displayed in the second section while controlling the fourth section 1705 to remain as an empty space, as shown in FIG. 17F. Referring to FIG. 17G, the controller controls the fourth window 1704 to be finally displayed in the second section.

FIGS. 18A, 18B, 18C, 18D, 18E, 18F, and 18G illustrate how to change window sizes according to embodiments of the present disclosure.

Figure 18A:
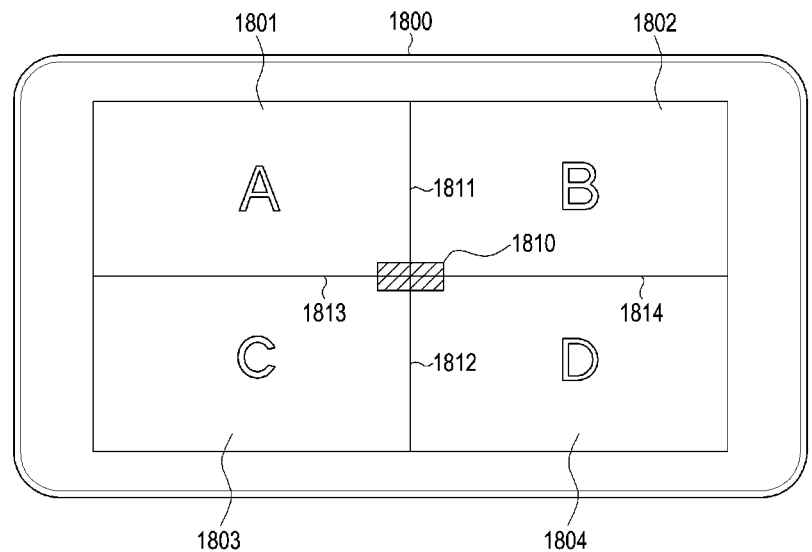
FIGS. 18A, 18B, 18C, 18D, 18E, 18F, and 18G illustrate how to change a window size according to embodiments of the present disclosure.

Referring to FIG. 18A, in an embodiment of a display device 1800, the touch screen is divided into four sections, each displaying a different window. The controller of the display device 1800 may establish a layout for the four sections. More specifically, the controller may establish a first section 1801, a second section 1802, a third section 1803, and a fourth section 1804. The controller may also set up a first border line 1811 between the first section 1801 and the second section 1802, a second border line 1812 between the third section 1803 and the fourth section 1804, a third border line 1813 between the first section 1801 and the third section 1803, and a fourth border line 1814 between the second section 1802 and the fourth section 1804.

The controller controls a respective window for running an application to be placed and displayed in each of the sections 1801 to 1804. For example, the controller controls a first window for running an application A to be displayed in the first section 1801, a second window for running an application B to be displayed in the second section 1802, a third window for running an application C to be displayed in the third section 1803, and a fourth window for running an application D to be displayed in the fourth section 1804.

The controller displays a center button 1810 at where the first, second, third and fourth border lines 1811, 1812, 1813, and 1814 intersect one another.

Figure 18B:
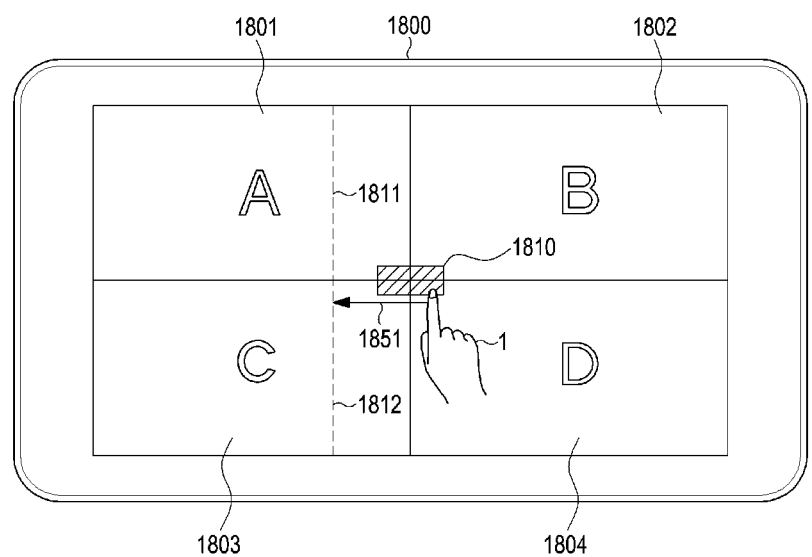
Figure 18C:
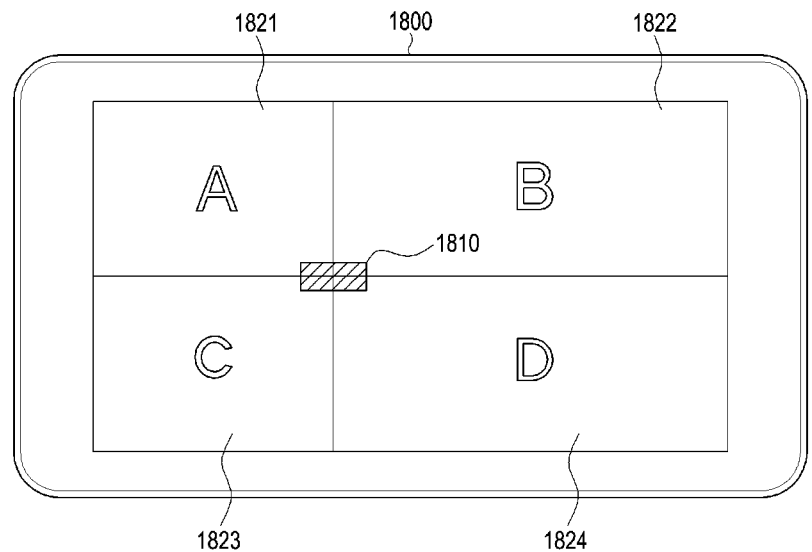

Referring to FIGS. 18B and 18C, the user 1 may make a drag gesture 1851 in the left direction from the center button 1810 to a first end point 1822 as a window-size change command. The controller controls the position of the center button 1810 to be moved to the first end point 1822. The controller may control the border lines 1811 to 1814 to be re-established and displayed based on the changed center button 1810. For example, the controller re-establishes the first border line 1811 to extend upward from the center button 1810, the second border line 1812 to extend downward from the center button 1810, the third border line 1813 to extend to the left from the center button 1810, and the fourth border line 1814 to extend to the right from the center button 1810. The controller also controls the first to fourth sections 1801 to 1804 to be changed in size (1821, 1822, 1823, and 1824) based on the re-established border lines 1811 to 1814. In contrast to the embodiment of FIG. 2C, sizes of all the window display spaces may be changed as well in the embodiment of FIG. 18B.

Figure 18D:
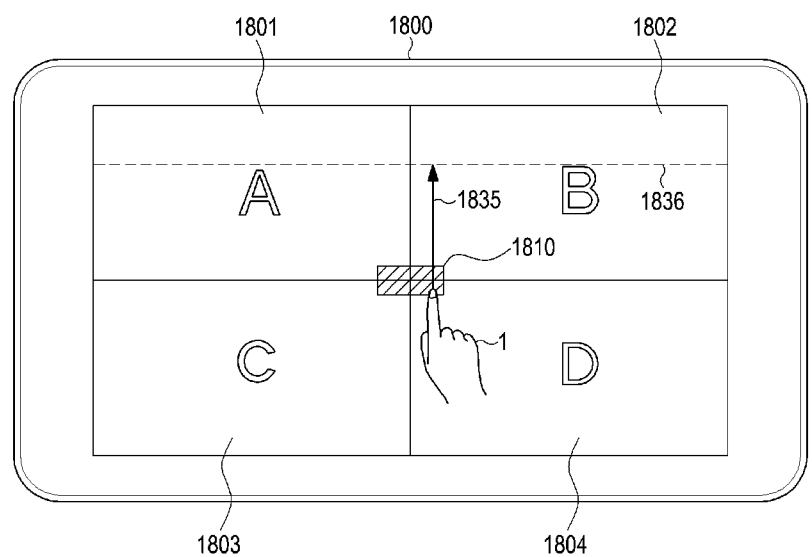
Figure 18E:
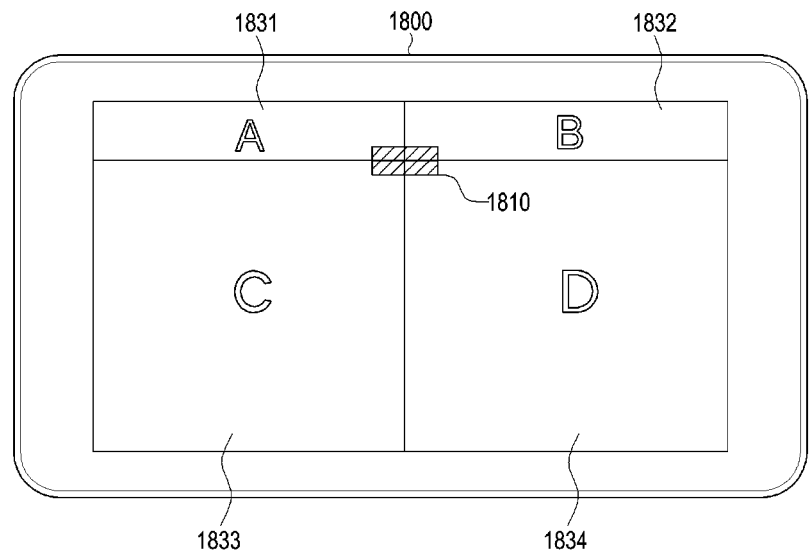

Referring to FIGS. 18D and 18E, the user 1 may make a drag gesture 1835 upward from the center button 1810 to a second end point 1836 as a window-size change command. The controller controls the position of the center button 1810 to be moved to the second end point 1836. The controller may control the border lines 1811 to 1814 to be re-established and displayed based on the changed center button 1810. The controller also controls the first to fourth sections 1801 to 1804 to be changed in size (1831, 1832, 1833, and 1834) based on the re-established border lines 1811 to 1814.

Figure 18F:
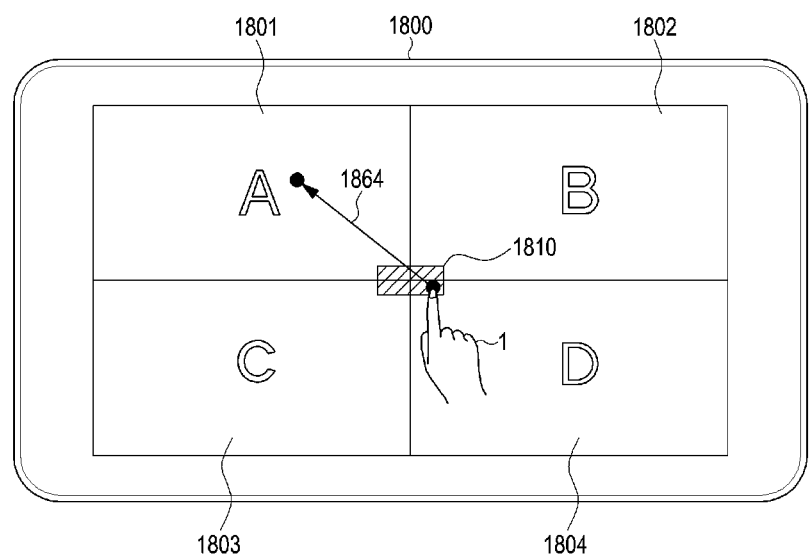
Figure 18G:
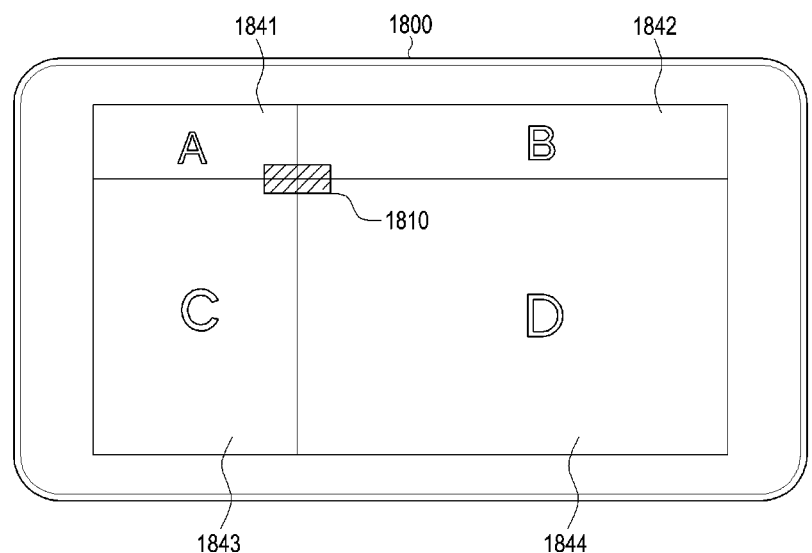

Referring to FIGS. 18F and 18G, the user 1 may make a drag gesture 1864 diagonally to the upper left side to a third end point 1865 as a window-size change command. The controller controls the position of the center button 1810 to be moved to the third end point 1865. The controller may control the border lines 1811 to 1814 to be re-established and displayed based on the center button 1810. The controller also controls the first to fourth sections 1801 to 1804 to be changed in size (1841, 1842, 1843, and 1844) based on the re-established border lines 1811 to 1814.

FIGS. 19A, 19B, 19C, 19D, 19E, and 19F illustrate how to change window positions according to embodiments of the present disclosure.

Figure 19A:
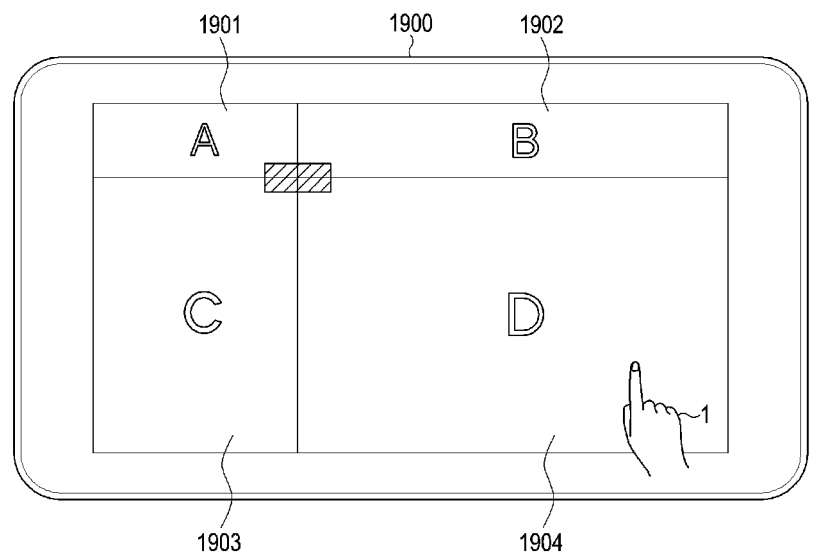
FIGS. 19A, 19B, 19C, 19D, 19E, and 19F illustrate how to change a window position according to embodiments of the present disclosure.
Figure 19B:
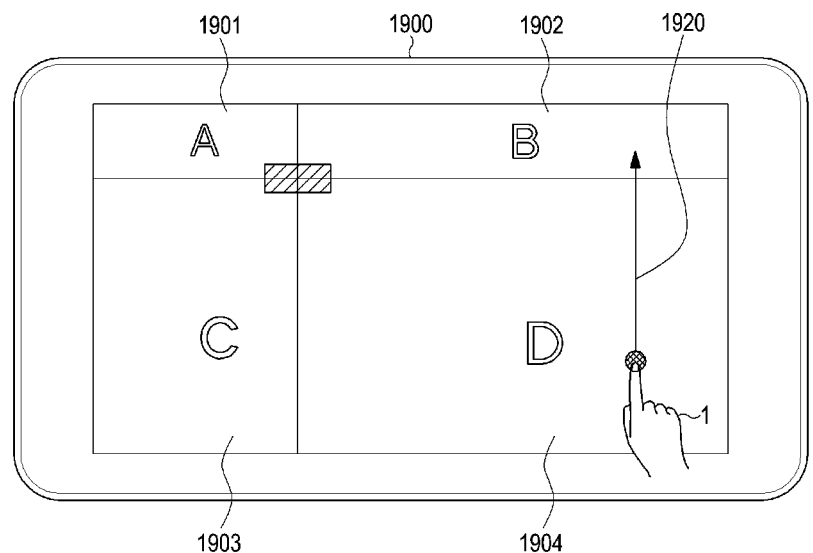

Referring to FIG. 19A, a display device 1900 may establish a plurality of window display spaces on the touch screen. More specifically, the controller may establish first to fourth sections. The controller controls a respective window for running an application to be placed and displayed in each of the sections. For example, the controller controls a first window 1901 for running an application A to be displayed in the first section, a second window 1902 for running an application B to be displayed in the second section, a third window 1903 for running an application C to be displayed in the third section, and a fourth window 1904 for running an application D to be displayed in the fourth section. In this regard, the controller may control the individual window display spaces to have different sizes. The controller may adjust the size of the widow display space, as described above in connection with FIGS. 18A, 18B, 18C, 18D, 18E, and 18F. It is assumed herein that the display device has entered the window-position change mode. The user 1 may designate the fourth window 1904 as a target window whose position is to be changed.

Figure 19C:
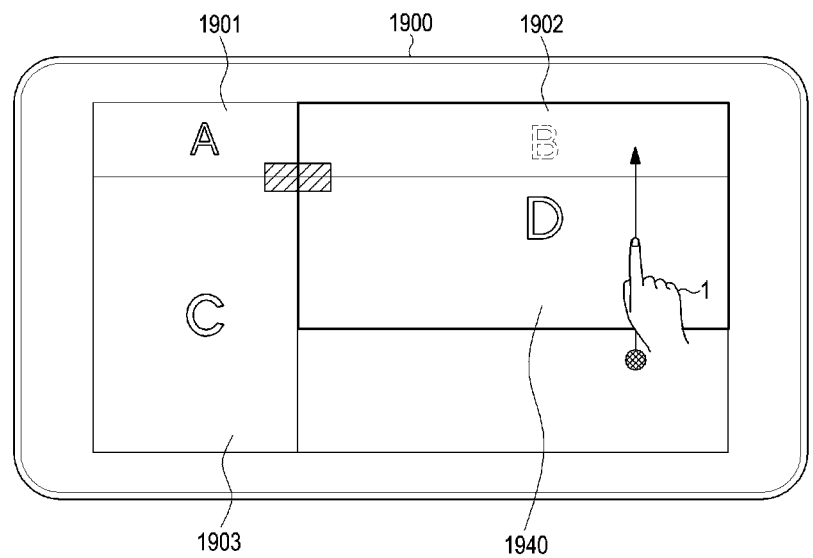
Figure 19D:
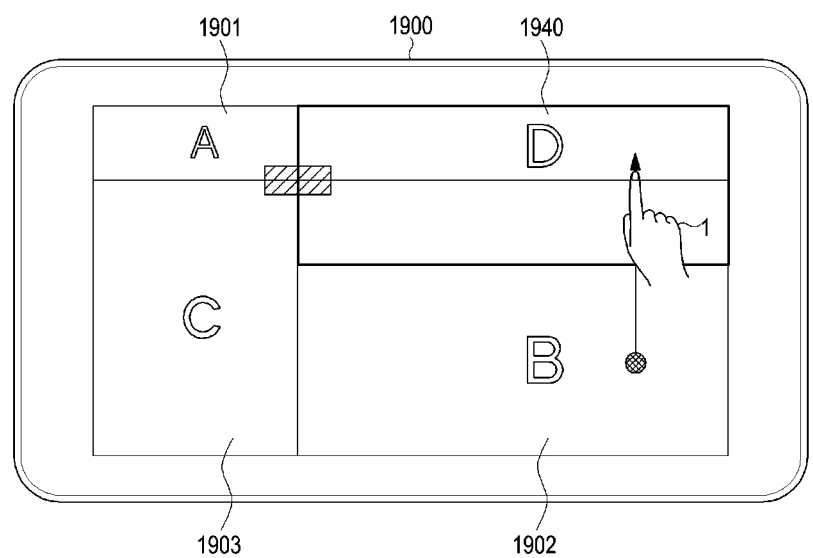
Figure 19E:
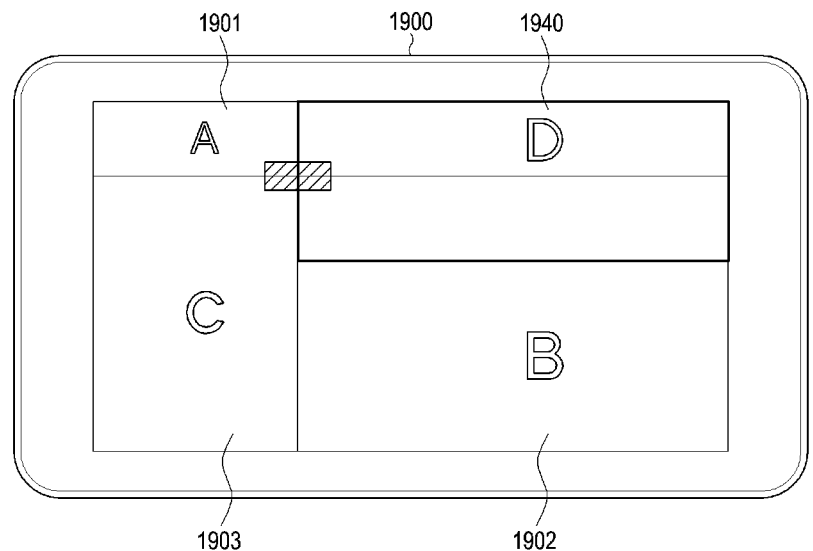

Referring to FIGS. 19B, 19C, 19D, and 19E, the user 1 may make a drag gesture 1920 starting from the target window 1904. The controller may display a ghost view 1940 around touch points of the drag gesture 1920, as shown in FIGS. 19C, 19D, and 19E. The user 1 may stop making the drag gesture 1920 within the first section, as shown in FIG. 19E. If a touch point of the drag gesture 1920 is in the second section as shown in FIG. 19D, the controller may control the second window 1902 that has been placed and displayed in the second section to be displayed in the fourth section to make room for the ghost view 1940. In this case, the controller may control the second window 1902 to be expanded to fit the fourth section.

Figure 19F:
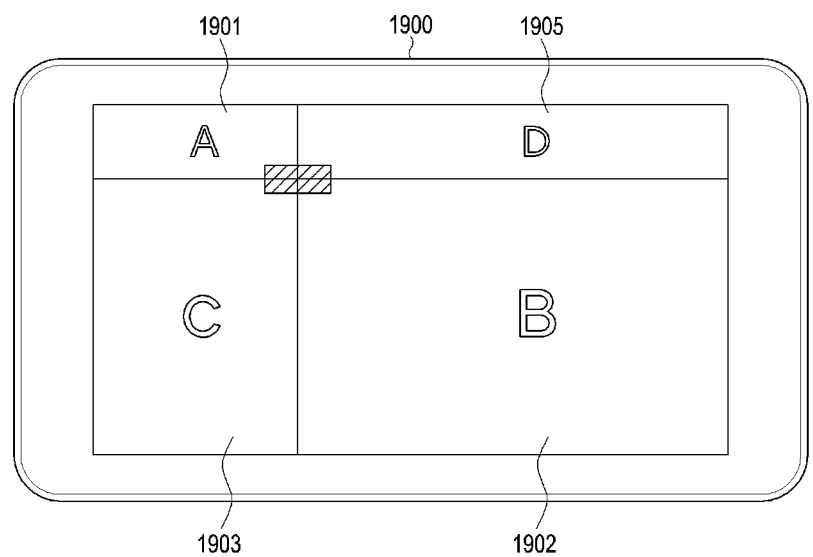

Referring to FIG. 19F, the controller may determine that the drag gesture 1920 ended in the second section. The controller controls the second window 1902 that has been placed in the second section to be swapped with the fourth window 1904 of the fourth section. In this case, the controller may control the fourth window 1904 to be reduced to fit the second section 1905.

FIGS. 20A, 20B, 20C, 20D, 20E, 20F, and 20G illustrate a display device according to embodiments of the present disclosure.

Figure 20A:
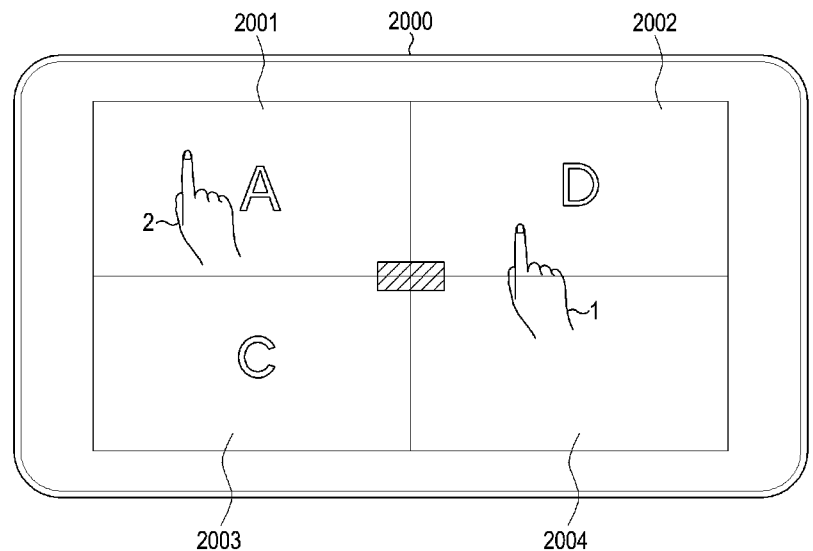
FIGS. 20A, 20B, 20C, 20D, 20E, 20F, and 20G illustrate a display device according to embodiments of the present disclosure.
Figure 20B:
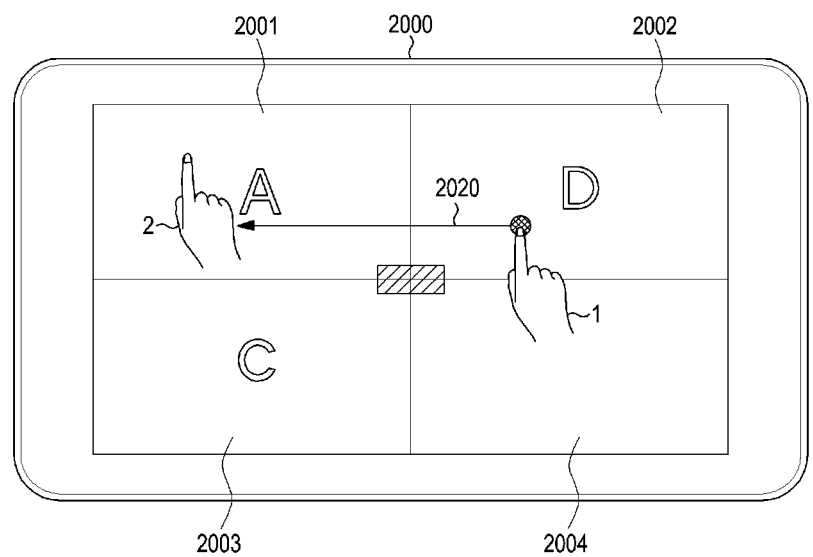

Referring to FIG. 20A, a display device 2000 displays a first window 2001, a fourth window 2002, and a third window 2003 in first to third sections, respectively, while remaining a fourth section 2004 empty. It is assumed herein that the display device has entered the window-position change mode. The controller reckons that a second window is placed under the fourth window 2002 in the second section. The user 1 may designate the fourth window 2002 as a target window whose position is to be changed. The user 1 may also input a window overlap command by touching the first window 2001 with another finger 2.

Figure 20C:
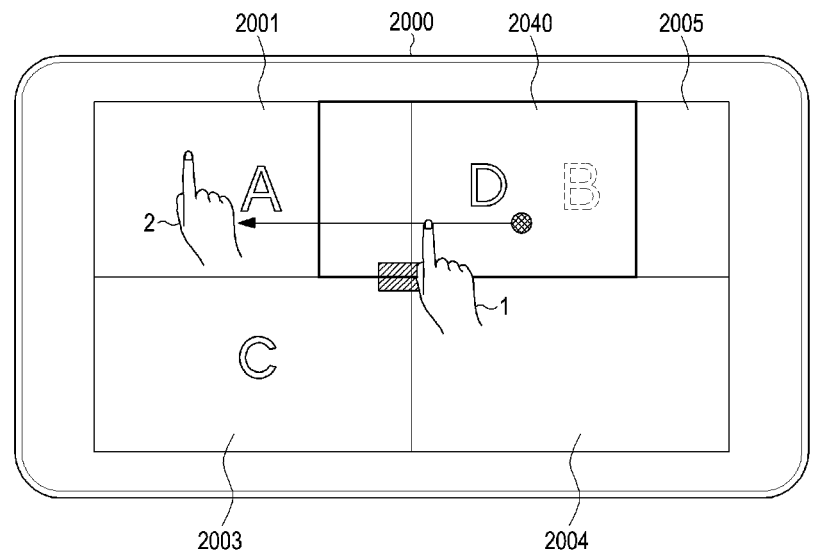
Figure 20D:
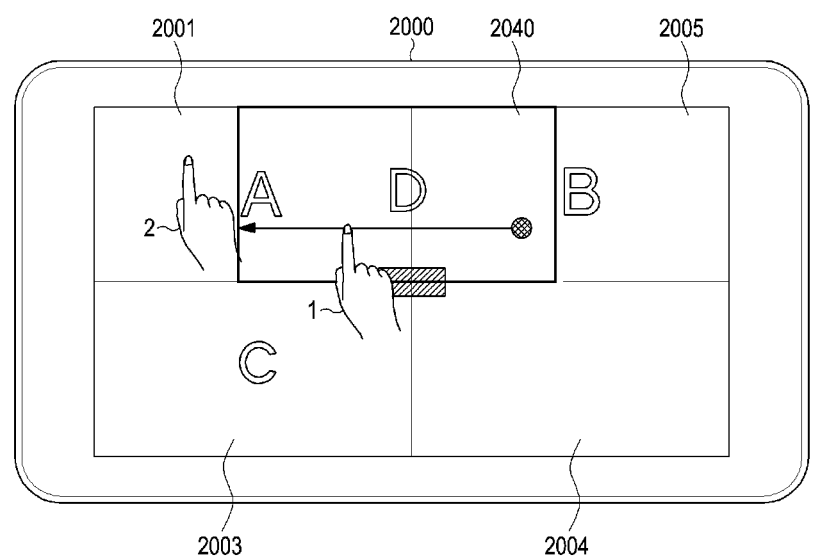
Figure 20E:
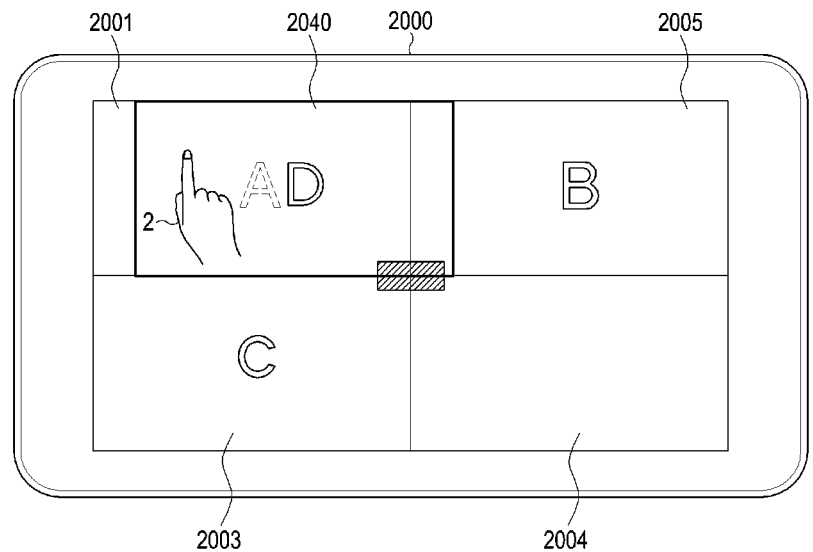

Referring to FIGS. 20B, 20C, 20D, 20E, the user 1 may make a drag gesture 2020 to change the position of the fourth window 2002 into the first section. In response, the controller may control a ghost view 2040 to be displayed around touch points of the drag gesture 2020, as shown in FIGS. 20C to 20E. In this case, the controller may control the position of the first window 2001 to be fixed according to the window overlap command.

Figure 20F:
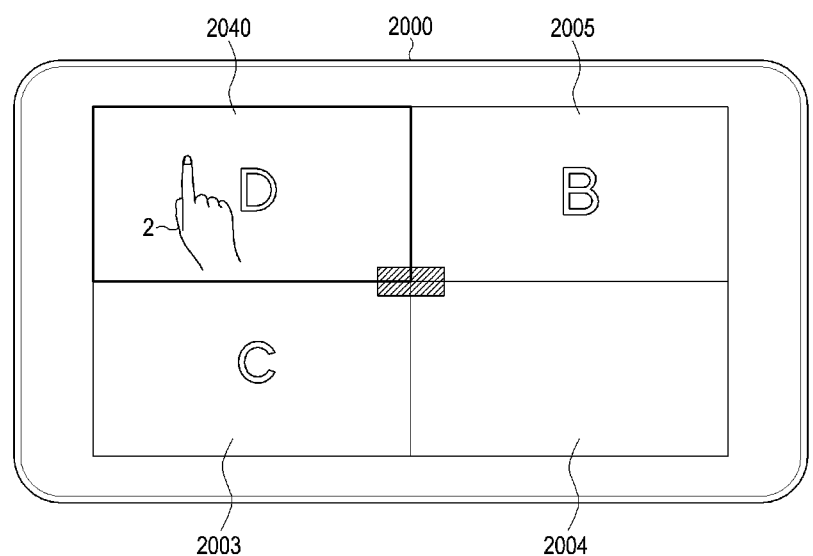
Figure 20G:
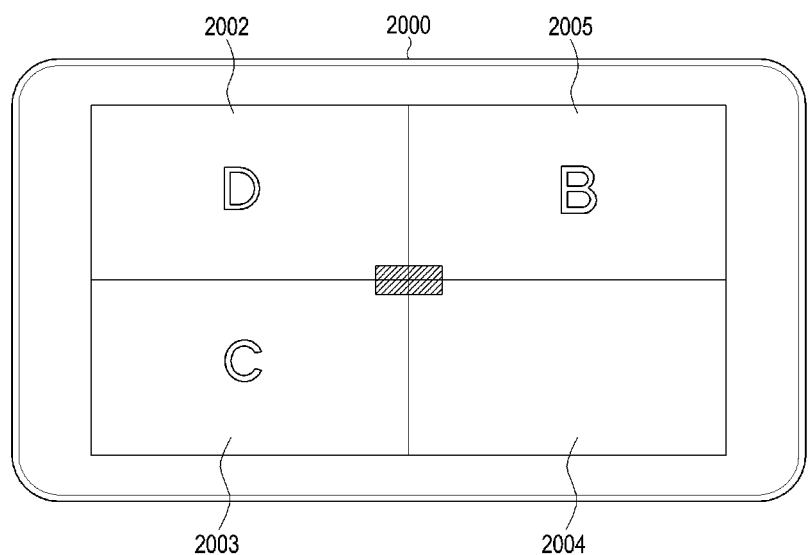

Referring to FIGS. 20F and 20G, the controller may determine that a window display space where the drag gesture 2020 ended is the first section. The controller may also determine that the first window 2001 is being displayed in the first section. The controller controls the fourth window 2002 to be displayed on top of the first window 2001 according to the window overlap command input to the first window 2001. Specifically, as shown in FIG. 20G, the controller controls the fourth window 2002 to be displayed in the first section while keeping the first window 2001 from being displayed. The controller may also manage an activity stack in order for the fourth window 2002 to be on top of the first window 2001 in the activity stack. The controller may also control a second ghost view 2005 to be displayed again in the second section. The controller also controls the fourth section 2002 to remain empty.

FIGS. 21A, 21B, 21C, 21D, 21E, and 21F illustrate a display device subsequent to FIG. 20G.

Figure 21A:
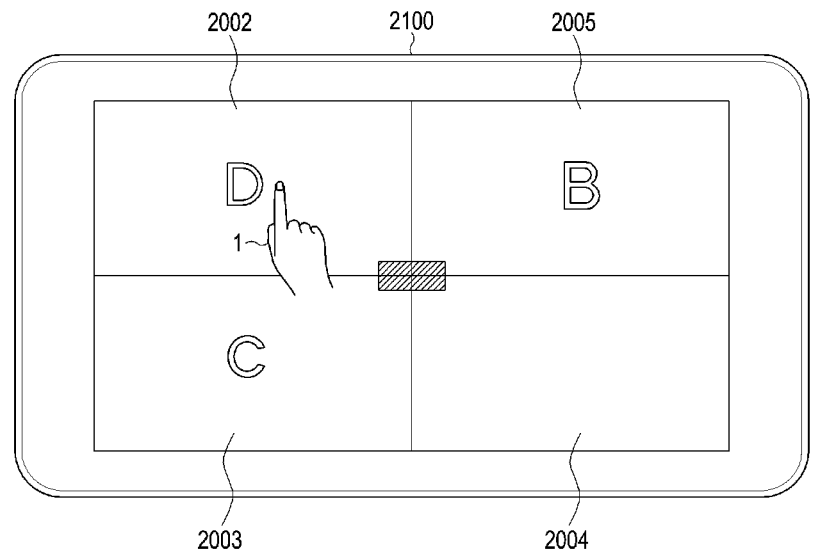
FIGS. 21A, 21B, 21C, 21D, 21E, and 21F illustrate a display device subsequent to FIG. 20G.
Figure 21B:
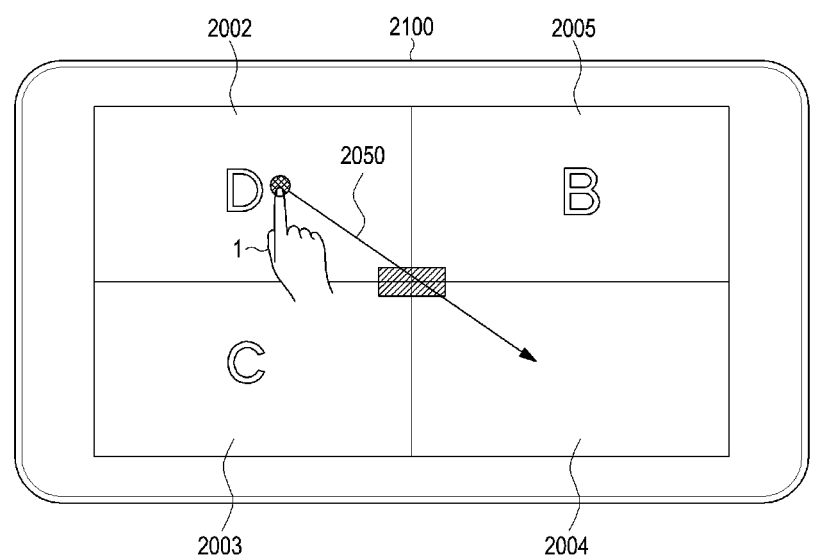
Figure 21C:
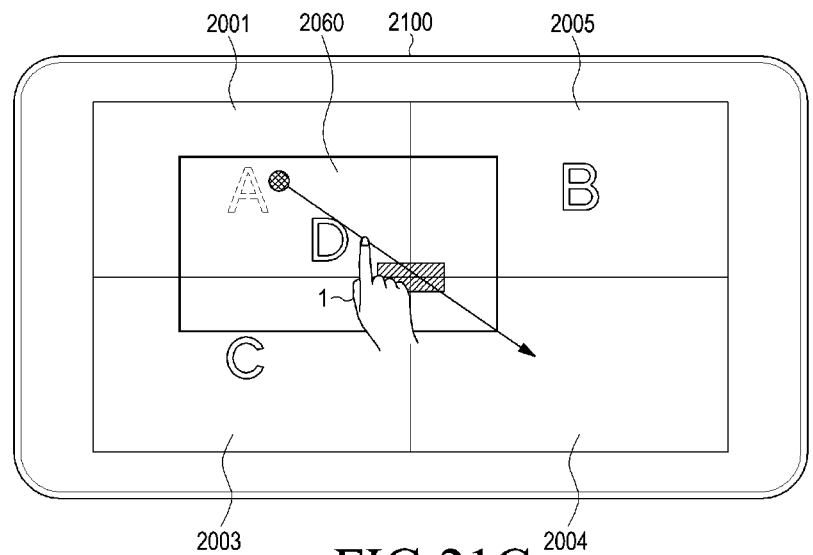
Figure 21D:
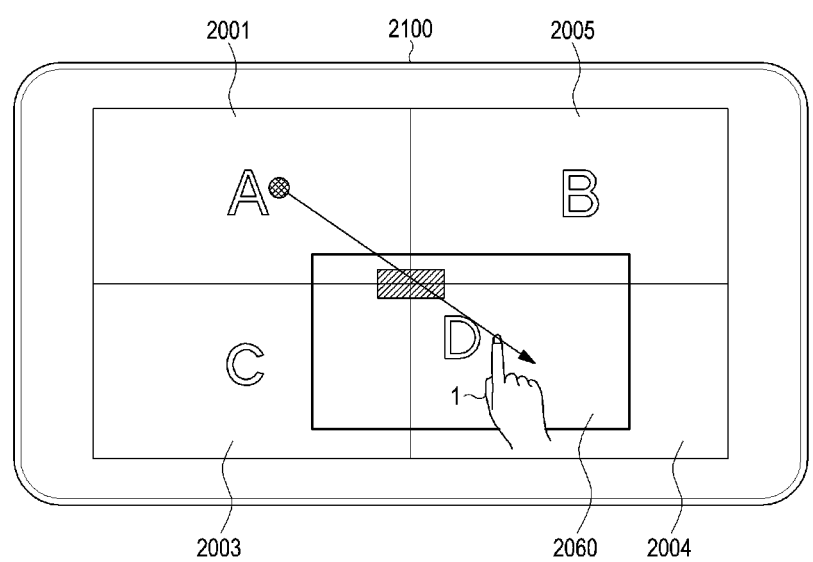
Figure 21E:
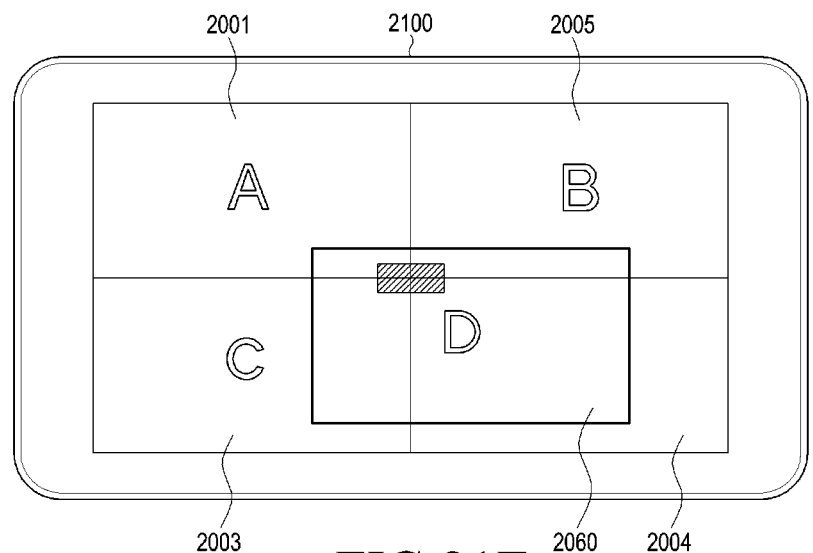
Figure 21F:
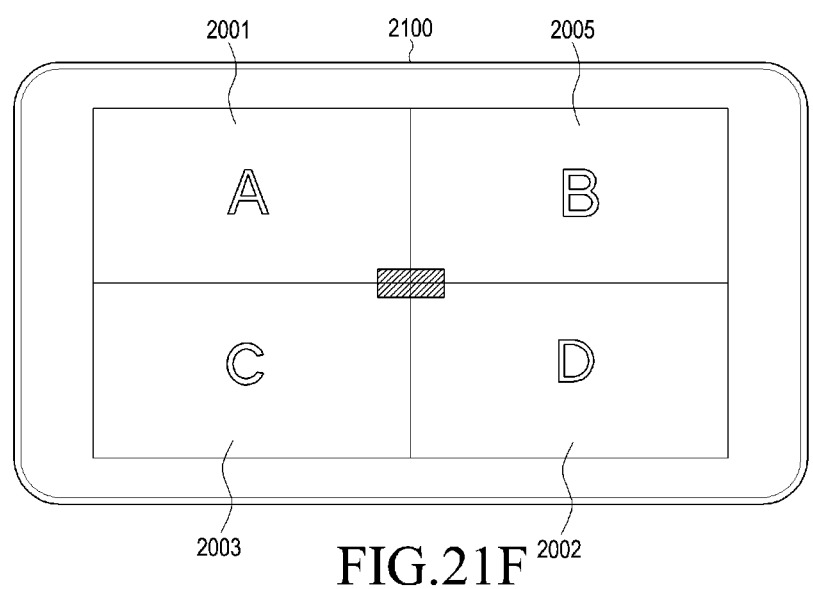

Referring to FIG. 21A, the user 1 designates the fourth window as a target window whose position is to be changed. Referring to FIG. 21B, the user 1 may make a drag gesture 2050 starting from the fourth window 2004. Referring to FIGS. 21C, 21D, and 21E, in response, the controller may control a ghost view 2060 to be displayed around touch points of the drag gesture 2050. The controller may also control the first window 2001 to be displayed back in the first section. Referring to FIG. 21F, the controller controls the fourth window 2002 to be displayed in the fourth section 2004.

According to various embodiments of the present disclosure, a display device and a method for controlling the same may be provided to run and control arrangement of multiple windows in a display. The user may use multiple applications displayed in multiple windows, simultaneously. Furthermore, the user may easily change arrangement of multiple applications, and thus, the user convenience may be maximized.

A non-transitory computer readable recording medium is any data storage device that can store data which can be thereafter read by a computer system. Examples of the non-transitory computer readable recording medium include a ROM, a RAM, a Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in a form of hardware, software, or a combination of hardware and software. The software may be stored as program instructions or computer readable codes executable on the processor on a computer-readable medium. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the computer readable recording medium include magnetic storage media (e.g., a ROM, floppy disks, hard disks, and the like), and optical recording media (e.g., CD-ROMs, or Digital Versatile Discs (DVDs)). The computer readable recording medium can also be distributed over network coupled computer systems so that the computer readable code is stored and executed in a distributed fashion. This media can be read by the computer, stored in the memory, and executed by the processor. The various embodiments may be implemented by a computer or portable terminal including a controller and a memory, and the memory may be an example of the computer readable recording medium suitable for storing a program or programs having instructions that implement the embodiments of the present disclosure. The various embodiments may be implemented by a program having codes for embodying the apparatus and a method described in claims, the program being stored in a machine (or computer) readable storage medium.

The display device may receive the program from a program provider wired/wirelessly connected thereto, and store the program. The program provider may include a memory for storing programs having instructions to perform the embodiments of the present disclosure, information used for the embodiments of the present disclosure, and the like, a communication unit for wired/wirelessly communicating with the mobile communication terminal 200, and a controller for sending the program to the mobile communication terminal 200 on request or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling an electronic device that includes a touch screen, the method comprising:
partitioning a screen displayed on the touch screen into a plurality of portions including a first portion and a second portion, wherein a window for displaying an execution screen of an application is displayed at each of the plurality of portions;
executing a launcher application;
based on executing the launcher application, identifying an empty portion where the window for displaying the execution screen of the application is not displayed among the plurality of portions;
based on identifying the first portion as the empty portion, displaying a first window for displaying an execution screen of a launcher application in the first portion being separate from the second portion of the plurality of portions, the execution screen of the launcher application presenting at least one icon to execute at least one application;
receiving, through the touch screen, a user touch input for dragging a first icon corresponding to a first application among the at least one application to the second portion of the plurality of portions and a releasing of the user touch input within the second portion, the second portion being separate from the first portion where the execution screen of the launcher application is displayed; and
based on the releasing of the user touch input within the second portion, executing the first application by using the launcher application and displaying, in the second portion being separate from the first portion, a second window for displaying an execution screen of the executed first application such that the execution screen of the executed launcher application and the execution screen of the executed first application do not overlap.

2. The method of claim 1, further comprising:
displaying respective windows in other portions than the first portion where the launcher application is displayed.

3. The method of claim 2, further comprising:
identifying activity stack levels of applications that are running in the plurality of portions.

4. The method of claim 3, further comprising:
displaying a window for running an application that has the top activity stack level based on the identified activity stack levels.

5. An electronic device comprising:
a touch screen; and
at least one processor configured to:
partition a screen displayed on the touch screen into a plurality of portions including a first portion and a second portion, wherein a window for displaying an execution screen of an application is displayed at each of the plurality of portions, and
execute a launcher application, based on executing the launcher application, identify an empty portion where the window for displaying the execution screen of the application is not displayed among the plurality of portions, based on identifying the first portion as the empty portion, display a first window for displaying an execution screen of the launcher application in the first portion being separate from the second portion of the plurality of portions, the execution screen of the launcher application presenting at least one icon to execute at least one application, receive, through the touch screen, a user touch input for dragging a first icon corresponding to a first application among the at least one application to the second portion of the plurality of portions and a releasing of the user touch input within the second portion, the second portion being separate from the first portion where the execution screen of the launcher application is displayed; and based on the releasing of the user touch input within the second portion, execute the first application and display, in the second portion being separate from the first portion, a second window for displaying an execution screen of the executed first application such that the execution screen of the executed launcher application and the execution screen of the executed first application do not overlap.

6. The electronic device of claim 5, wherein the at least one processor is further configured to display respective windows in other portions than the first portion where the launcher application is displayed.

7. The electronic device of claim 6, wherein the at least one processor is further configured to identify activity stack levels of applications that are running in the plurality of portions.

8. The electronic device of claim 7, wherein the at least one processor is further configured to display a window for running an application that has a top activity stack level based on the identified activity stack levels.

9. A method for controlling an electronic device that includes a touch screen, the method comprising:

partitioning a screen displayed on the touch screen into a plurality of portions including a first portion and a second portion;

displaying a first window for displaying an execution screen of a first application in the first portion;

entering a window-position change mode to change a position of a window;

during the window-position change mode, receiving a window-position change command to change a position of the first window from the first portion to the second portion;

based on receiving the window-position change command:

determining whether a second window is placed in the second portion separate from the first portion;

based on determining that the second window is placed in the second portion, moving the first window, being displayed in the first portion, to the second portion;

in response to the movement of the first window from the first portion to the second portion, moving the second window, being displayed in the second portion, to the first portion; and based on determining that the second window is not placed in the second portion, moving the first window, being displayed in the first portion, to the second portion and remaining the first portion such that the second window is not placed in the first portion.

10. The method of claim 9, wherein the partitioning the screen displayed on the touch screen into the plurality of portions including the first portion and the second portion comprises:

displaying a plurality of border lines that separate the plurality of portions; and displaying a center button at an intersection of the plurality of border lines to control the plurality of portions.

11. The method of claim 10, wherein the entering of the window-position change mode comprises:

entering the window-position change mode when a long press gesture is made on the center button.

12. The method of claim 9, wherein the window-position change command includes a drag gesture starting from the first window and ending in the second plurality of portions.

13. The method of claim 12, wherein the receiving of the window-position change command comprises:

displaying and moving a ghost view along with the window-position change command, the ghost view having the same figure as the first window but different color or brightness from that of the first window.

14. The method of claim 9, wherein the displaying of the first window further comprises displaying the second window in the second portion.

15. The method of claim 14, wherein the receiving of the window-position change command comprises further receiving a window overlap command for the second window.

16. The method of claim 15, wherein the window overlap command includes a gesture of touching the second window while receiving the window-position change command.

17. The method of claim 15, wherein the displaying of the first window for displaying an execution screen of the first application in the first portion comprises:

displaying the first window in the second portion without displaying the second window.

18. The method of claim 17, further comprising:

receiving a window display command to move the first window to a third portion; and displaying the first window in the third portion and displaying the second window in the second portion.

19. The method of claim 9, wherein the partitioning of the screen displayed on the touch screen into the plurality of portions including the first portion and the second portion comprises:

setting sizes of the first and second portions to be different from each other.

20. The method of claim 19, wherein the displaying of the first window for displaying an execution screen of a first application in the first portion comprises:

re-establishing and displaying the first window to fit the second portion.

21. An electronic device comprising:

a touch screen; and at least one processor configured to:

partition a screen displayed on the touch screen into a plurality of portions including a first portion and a second portion, display a first window for displaying an execution screen of a first application in the first portion, enter a window-position change mode to change window positions, during the window-position change mode, receive a window-position change command to change a position of the first window from the first portion to the second portion, based on receiving the window-position change command, determine whether a second window is placed in the second portion separate from the first portion, and based on determining that the second window is placed in the second portion, move the first window, being displayed in the first portion, to the second portion, in response to the movement of the first window from the first portion to the second portion, move the second window, being displayed in the second portion, to the first portion, and based on determining that the second window is not placed in the second portion, move the first window, being displayed in the first portion, to the second portion and remain the first portion such that the second window is not placed in the first portion.

22. The electronic device of claim 21, wherein the touch screen displays a plurality of border lines that separate the plurality of portions, and displays a center button at an intersection of the plurality of border lines to control the plurality of portions.

23. The electronic device of claim 22, wherein the at least one processor is further configured to enter the window-position change mode when a long press gesture is made on the center button.

24. The electronic device of claim 21, wherein the window-position change command comprises a drag gesture starting from the first window and ending in the second window display space.

25. The electronic device of claim 24, wherein the at least one processor is further configured to display and move a ghost view along with the drag gesture, the ghost view being presented to have the same figure as the first window but different color or brightness from that of the first window.

26. The electronic device of claim 21, wherein the touch screen displays a second window in the second portion.

27. The electronic device of claim 26, wherein the touch screen further receives a window overlap command for the second window.

28. The electronic device of claim 27, wherein the window overlap command is a gesture of touching the second window while receiving the window-position change command.

29. The electronic device of claim 27, wherein the at least one processor is further configured to control the first window to be displayed while keeping the second window from being displayed in the second portion.

30. The electronic device of claim 29,
wherein the touch screen receives a window display command to move the first window to a third portion, and
wherein the at least one processor is further configured to control the first window to be displayed in the third portion and the second window to be displayed in the second portion.

31. The electronic device of claim 21, wherein the at least one processor is further configured to establish the plurality of portions with sizes of the first and second portions being different from each other.

32. The electronic device of claim 31, wherein the at least one processor is further configured to control the first window to be re-established and displayed to fit the second portion.

33. A method for controlling an electronic device that includes a touch screen, the method comprising:
displaying a panel including at least one icon corresponding to an application;
receiving, through the touch screen, a user touch input for dragging a first icon of the at least one icon to a first point on the touch screen, wherein the first icon is for executing a first application;
based on the dragging of the first icon of the at least one icon, stopping the displaying of the panel including the at least one icon;
based on the user touch input for dragging the first icon being detected at the first point of the touch screen, displaying a ghost view corresponding to a window for displaying an execution screen of the first application at the first point while the panel including the at least one icon is not displayed, wherein the ghost view shows in advance at least one of size, shape, or position of the window for displaying the execution screen of the first application; and
stopping the displaying of the ghost view and displaying of the window for displaying the execution screen of the first application in response to detecting a release of the user touch input.

34. The method of claim 33, wherein a window display space in which the user touch input ends and the ghost view have the same size and shape but different colors or brightness.

35. The method of claim 33, wherein the displaying of the window comprises:
displaying the window for displaying the execution screen of the first application to have the same size, shape, and position as those of the ghost view.

36. The method of claim 33, wherein the displaying of the ghost view comprises:
displaying the ghost view in full screen if there is no window displayed when the user touch input is received.

37. The method of claim 33, wherein the displaying of the ghost view comprises:
displaying the ghost view to have half a size and shape of the touch screen, if there is one window displayed when the user touch input is entered.

38. The method of claim 37, wherein the ghost view has half a size and shape of one of left and right halves or one of upper and lower halves of the touch screen.

39. An electronic device comprising:
a touch screen configured to:
display a panel including at least one icon corresponding to an application, and
receive a user touch input for dragging a first icon of the at least one icon to a first point on the touch screen, wherein the first icon is for executing a first application; and
at least one processor configured to:
based on the dragging of the first icon of the at least one icon, stop the displaying of the panel including the at least one icon,
based on the user touch input for dragging the first icon being detected at the first point of the touch screen, display a ghost view corresponding to a window for displaying an execution screen of the first application at the first point while the panel including the at least one icon is not displayed, wherein the ghost view shows in advance at least one of size, shape, or position of the window for running the first application, and stop displaying the ghost view and displaying the window for displaying the execution screen of the first application in response to detecting a release of the user touch input.

40. The electronic device of claim 39, wherein a window display space in which the user touch input ends and the ghost view have the same size and figure but different colors or brightness.

41. The electronic device of claim 39, wherein the touch screen displays the window for displaying the execution screen of the first application to have the same size, shape, and position as those of the ghost view.

42. The electronic device of claim 39, wherein the at least one processor is further configured to display the ghost view in full screen, if there is no window displayed when the user touch input is received.

43. The electronic device of claim 39, wherein the at least one processor is further configured to display the ghost view in half a size and shape of the touch screen, if there is one window displayed when an application run command is entered.

44. The electronic device of claim 43, wherein the ghost view has half a size and shape of one of left and right halves or one of upper and lower halves of the touch screen.

45. A non-transitory computer-readable recording medium having recorded thereon a program, which, when executed by a computer, implements the method of claim 1.

46. A non-transitory computer-readable recording medium having recorded thereon a program, which, when executed by a computer, implements the method of claim 9.

47. A non-transitory computer-readable recording medium having recorded thereon a program, which, when executed by a computer, implements the method of claim 33.

* * * * *